(12) United States Patent
Mirbaha et al.

(10) Patent No.: US 8,862,055 B2
(45) Date of Patent: Oct. 14, 2014

(54) SYSTEMS AND METHODS FOR DEFINING GROUP OF USERS WITH MOBILE DEVICES

(75) Inventors: Ramin Mirbaha, Dachau (DE); Vahid Mirbaha, Eching (DE)

(73) Assignee: Takwak GmbH, Munich (DE)

( * ) Notice: Subject to any disclaimer, the term of this patent is extended or adjusted under 35 U.S.C. 154(b) by 436 days.

(21) Appl. No.: 13/363,186

(22) Filed: Jan. 31, 2012

(65) Prior Publication Data

US 2012/0202428 A1 Aug. 9, 2012

(51) Int. Cl.
*H04W 4/08* (2009.01)
*H04W 4/10* (2009.01)
*H04W 88/06* (2009.01)

(52) U.S. Cl.
USPC ........... 455/41.2; 455/518; 455/519; 455/557

(58) Field of Classification Search
USPC ................................ 455/41.2, 517, 518, 557
See application file for complete search history.

(56) References Cited

U.S. PATENT DOCUMENTS

2005/0180394 A1* 8/2005 Kautz et al. ................... 370/352
2009/0112885 A1* 4/2009 Markovich ....................... 707/10
2009/0112981 A1* 4/2009 Markovich ..................... 709/203
2012/0202551 A1* 8/2012 Mirbaha et al. ............... 455/518

FOREIGN PATENT DOCUMENTS

EP 1 662 833 A1 5/2006

OTHER PUBLICATIONS

International Search Report issued Aug. 3, 2012 in PCT Application No. PCT/IB2012/000229.

* cited by examiner

*Primary Examiner* — Bobbak Safaipour
(74) *Attorney, Agent, or Firm* — Foley & Lardner LLP; Christopher J. McKenna; Shabbi S. Khan

(57) ABSTRACT

The present solution defines groups of users with mobile devices that will be used for the outdoor activity. A group of users may defined with mobile computing devices capable of sending and receiving certain data via radio waves. Each of these devices is equipped with at least one button which can be pressed to invoke the grouping process. One additional mobile computing device capable of sending and receiving information via radio waves and able to receive and store information from any of the mobile computing devices, store these, allow any of the same computing devices to retrieve this information and able to send such information to one or mobile computing devices in such a way that the information arrives at the mobile computing devices via radio waves.

20 Claims, 16 Drawing Sheets

WELCOME APPEARANCE (Connected Mode)

WELCOME APPEARANCE (PND Mode)

SYSTEMS AND METHODS FOR DEFINING GROUP OF USERS WITH MOBILE DEVICES

RELATED APPLICATIONS

This application claims the benefit of and priority to U.S. Provisional Application No. 61/439,732, entitled "SYSTEMS AND METHODS FOR DEFINING GROUP OF USERS WITH MOBILE DEVICES" and filed on Feb. 4, 2011, and U.S. Provisional Application No. 61/443,165 entitled "SYSTEMS AND METHODS FOR DEFINING GROUP OF USES WITH MOBILE DEVICES" and filed on Feb. 15, 2011, both of which are incorporated herein by reference in its entirety.

FIELD OF THE INVENTION

The present application generally relates to mobile communication devices for outdoor activities. In particular, the present application relates to systems and methods for defining a group of users with mobile devices.

BACKGROUND

Users located in an outdoor environment or participating in an outdoor activity may use mobile devices to try to communicate with each other. In such outdoor environments it may be difficult to know where the other users are located and where they are heading if communications are sporadic or interrupted. Furthermore, it may be difficult for the users to recall who is in participating in the activity and know the details of any one user's location, heading and surrounding environment. The lack of information may make it challenging for any user to communicate, track and manage the other users.

BRIEF SUMMARY

The present solution provides systems and methods for defining groups of users with mobile devices that will be used for the outdoor activity. The present solution may define a group of users with mobile computing devices capable of sending and receiving certain data via radio waves. An N number of human users may want to form a group with each other via N number of mobile computing devices capable of sending and receiving information over radio waves. Each of these devices is equipped with at least one button which can be pressed to invoke the grouping process. One additional mobile computing device capable of sending and receiving information via radio waves and able to receive and store information from any of the N mobile computing devices, store these, allow any of the same N computing devices to retrieve this information and able to send such information to one or N mobile computing devices in such a way that the information arrives at the mobile computing devices via radio waves.

Generally, the present disclosure describes a wireless multi-purpose and multi-function handheld mobile device, herein also interchangeably referred to as a mobile device or a device, may enable a user of a group of users in an outdoor environment to communicate with each other, individually as well as a group. The users may utilize the features of the mobile device to navigate through the outdoor terrain via a personal global positioning system (GPS) functions in addition communicating with other group members via a private radio communication functions, thus using the mobile device as a walky-talky operating over a range of radio frequencies. Mobile device may enable a user to connect to relevant content and social network via a cellular telephone communication functionalities for accessing the internet, such as a general packet radio service (GPRS), enhanced data rates for GSM (EDGE) or the enhanced GPRS (EGPRS), or a wireless local area network (WLAN) technology. Mobile device may also enable a user to communicate freely using radio frequency range, as a private mobile radio (PMR). For example, the users may use the device for private radio communication purposes via channels of a PMR 446 radio frequencies operating at around 446 MHz. The multipurpose and multifunction hand-held mobile device may therefore provide the user with means for navigating through the outdoors as well as for off-net/on net group communication, individual telephone communication, access to the internet and with a range of additional group community services. The device may combine GPS, PMR 446 with GSM, such as GPRS or 3 G communication bearers to provide advanced group communication services on top of a standard open operating based user customizable Smart Phone.

Mobile device may be include a range of applications that are easy to use, such as a magnetic compass, outdoor activity relevant applications, such as group functions for tracking presence and location of other members of a group, as well as additional third party applications. Mobile device may include a camera or a camcorder, a light emitting diode (LED) flash light and a barometer which may be used as a barometric altimeter. Mobile device hand-held device may provide multitude of services to an outdoor enthusiast by enabling the user to use the device as a GPS navigation device, on road as well as in uninhabited areas, such as off-road areas, mountains or deserts. The device may be used by families and friends with serious outdoor sports hobbies, such as skiing, snowboarding, mountain biking, hiking or climbing, camping, caravanning, motorcycling, globetrotting, hunting, fishing, boating or river rafting.

In particular aspects of the present disclosure, a group of outdoor enthusiasts in an expedition may explore a particular outdoor area while sharing information and staying in close contact with other members of the group. In order to share information and use group operations, the mobile device users may form a group via a grouping function of their mobile devices 100. As traditional mobile devices normally do not provide group specific services to users in remote outdoor areas, especially when such areas are not covered by a mobile service provider, the mobile devices may provide such services via radio frequencies, such as frequencies used by walky talky PMR radios. Mobile devices may enable users to exchange communication via their PMR radio functions and the users may remain in a close contact even if they are not within a mobile telephone coverage area. The users may also use the group functions of their mobile devices to share any relevant information about each other or the expedition. In addition, the users may access various group application functions to better navigate through the area as well as to document their experiences.

In one aspect, the present disclosure is directed to a method for defining a group of mobile devices. The group of mobile devices includes private mobile radio modules. In some embodiments, the method includes broadcasting a first request to establish a group. The first request is broadcasted by each mobile device of a plurality of mobile devices. The plurality of mobile devices are within proximity of each of the other mobile devices. The group may be established on a predetermined channel via a private mobile radio module. The group may also be established using a predetermined modulated code. The method may include receiving the first request from a second mobile device. The first request is received by a first mobile device. The first mobile device is one of the plurality of mobile devices listening for the predetermined modulated code on the predetermined channel. The second mobile device may be one of the plurality of mobile devices. The method may also include transmitting a first response. The first response is transmitted in response to receiving the first request and includes an answer to the first request. The first response is transmitted by the first mobile device to the second mobile device. The method may also include receiving a second request. The second request is from the second mobile device and is received by the first mobile device. The second request may include an encryption key. The method may also include transmitting a second response. The second response is transmitted by the first mobile device to the second mobile device. The second response includes one or more unique identifiers of mobile devices. These mobile devices were observed by the first mobile device as requesting to form a group. The second response is responsive to receiving the second request. The second response is encrypted using the encryption key of the second request. The method may also include establishing the group. The group is established by at least the first mobile device and the second mobile device of the plurality of mobile devices. The establishment of the group is responsive to receipt of the second response by the second mobile device.

In one embodiment, the method may also include determining a signal strength on the predetermined channel. The signal strength may be determined by a third mobile device of the plurality of mobile devices. The third mobile device may determine that the signal strength has dropped below a predetermined level.

In one embodiment, the method may also include rebroadcasting the first request to form the group. The rebroadcast may be responsive to the determination that the signal strength has dropped below a predetermined level.

In one embodiment, the method may include exchanging the requests and responses to have the third mobile device join the group. The requests and responses may be exchanged by the third mobile device with at least one of the first mobile device or the second mobile device.

In one embodiment, the method may include broadcasting the signal responsive to pressing of a button. Each mobile device may broadcast the signal. The button may be on each mobile device and may be pressed by a corresponding user. The group may be formed when each user concurrently presses the button on the corresponding mobile device for a predetermined period of the time.

In one embodiment, the method includes forming a circle within a proximity of each mobile device. The circle may be formed by the users of the plurality of mobile devices.

In one embodiment, the method includes receiving a unique identifier of the second mobile device. The unique identifier may be received by the first mobile from the second mobile device. The unique identifier may be received via the first request.

In one embodiment, the method includes transmitting the first response that includes one of an acknowledgement to form the group or a request for the second mobile device's encryption key. The first response is transmitted by the first mobile device to the second mobile device.

In one embodiment, the method includes transmitting the first response that includes a unique identifier of the first mobile device. The first response is transmitted by the first mobile device to the second mobile device.

In one embodiment, the method includes decrypting the second response using the encryption key. The decryption is done by the first mobile device. The second response is from the second mobile device.

In one aspect, the present disclosure is directed to a system for defining a group of mobile devices. The system includes private mobile radio modules. In some embodiments, the system includes a plurality of mobile devices. The mobile devices are within proximity of each of the other mobile devices. The system includes a transmitter that transmits a first request. The first request is a request to establish a group. The first request is transmitted on a predetermined channel using a predetermined modulated code. The transmitter is of a private mobile radio module. Each mobile device of the plurality of mobile devices includes this private mobile radio module. The systems includes a first receiver. The first receiver is of a first private mobile radio, which is of a first mobile device of the plurality of mobile devices. The first receiver listens for the predetermined modulated code on the predetermined channel. The first receiver also receives the first request. The first request is from a second mobile device of the first plurality of mobile devices. The system includes a first transmitter. The first transmitter is of the first private mobile radio, which is of the first mobile device. The first transmitter transmits a first response that includes an answer to the first request. The first response is responsive to the first request. The first response is transmitted from the first mobile device to the second mobile device. The first receiver can further receive a second request that includes an encryption key. The first transmitter can further transmit a second response that includes one or more unique identifiers of mobile devices. The first transmitter may transmit the second response from the first mobile device to the second mobile device. The second response may be responsive to receiving the second request. The unique identifiers may identify mobile devices that may have been observed by the first mobile device as requesting to form a group. The second response may be encrypted using the encryption key of the second request. The system further includes the establishment of the group responsive to receipt of the second response by the second mobile device. The group is established by at least the first mobile device and the second mobile device of the plurality of mobile devices.

In one embodiment, the system includes a third mobile device. The third mobile device is of the plurality of mobile devices. The third device determines that the signal strength on the predetermined channel has dropped below a predetermined level. In one embodiment, the third mobile device rebroadcasts the first request to form the group. The rebroadcast of the first request is responsive to the determination that the signal strength on the predetermined channel has dropped below a predetermined level. In one embodiment, the third mobile device exchanges requests and responses to have the third mobile device join the group. The third mobile devices exchanges these requests and responses with at least one of the first mobile device or the second mobile device.

In one embodiment, the private mobile radio of each mobile device transmits the first request to form the group responsive to pressing of a button. The button is on each mobile device and is pressed by a corresponding user. The first request is transmitted when each user concurrently presses the button on the corresponding mobile device for a predetermined period of time.

In one embodiment, the plurality of mobile devices are arranged into a circle within proximity of each mobile device. In one embodiment, the first mobile device receives a unique identifier of the second mobile device. The unique identifier is received via the first request from the second mobile device.

In one embodiment, the first mobile device transmits the first response that includes one of an acknowledgment to form the group or a request for the second mobile device's encryption key. The first mobile device transmits this first response to the second mobile device.

In one embodiment, the first mobile device transmits the first response that includes a unique identifier of the first mobile device. In one embodiment, the first mobile device decrypts the second response using the encryption key. The second response is from the second mobile device.

In one aspect, the present disclosure is directed to a method for defining a group of mobile devices. The method includes broadcasting a device name. Each mobile device of a plurality of mobile devices broadcasts a device name via Bluetooth. The broadcast is in a predetermined format and includes a user name and a uniform resource identifier. The method includes receiving the device name of each of the other mobile devices. The device name is received by each mobile device of the plurality of mobile devices via Bluetooth. The method includes determining that the device name of each of the other mobile devices corresponds to the predetermined format. Each mobile device makes this determination. The method includes designating a leader of a group. The designation is done by a mobile device of the plurality of mobile devices. The designation is based on the uniform resource identifier identified from the device name of the mobile device. The method includes providing a list of user names. The list of user names is identified from each of the device names, which correspond to the predetermined format. The list of user names are provided by the mobile device. The method includes receiving a selection of one or more user names from the list. The selection of user names is received by the mobile device. The selection of one or more user names is used to form the group.

In one embodiment, the method includes performing a login of a user to a server. Each device performs the login of the user based on the device name that was broadcasted via Bluetooth. In one embodiment, the method includes broadcasting the mobile device identifier in the broadcast of each mobile device's device name. The broadcast of the device name including the mobile device identifier is in the predetermined format. In another embodiment, the method includes broadcasting the user's mobile telephone number in the broadcast of each mobile device's device name. The broadcast of the device name including the user's mobile telephone number is in the predetermined format.

In one embodiment, the method includes each mobile device filtering out any device name received during Bluetooth discovery that does not correspond to the predetermined format.

In one embodiment, the method includes a designation by the mobile device to be the leader of the group. The designation is based on the mobile device's uniform resource identifier being lower alphabetically from any uniform resource identifier identified from device names of the other mobile devices. In another embodiment, the designation is based on the mobile device's uniform resource identifier being alphabetically higher than the uniform resource identifier of the other mobile devices.

In one embodiment, the method includes transmitting a group formed message to the other mobile devices via a server. The transmission of the group formed message is responsive to the selection of the user names to form the group.

In one embodiment, the method includes the mobile device receiving a selection of one or more features of the group. The selection is received from a user of the mobile device that is designated as the leader of the group.

In one embodiment, the method includes the mobile device receiving a request by a user. The user is designated as the leader of the group. The request is to activate the formed group. The method also includes the mobile device transmitting a message responsive to the request. The message, which is transmitted to a server, is to activate the formed group. The method also includes each of the plurality of devices receiving an indicator that the formed group is active.

In one aspect, the present disclosure is directed to a system for defining a group of mobile devices. In one embodiment, the system includes a plurality of mobile devices. Each mobile device of the plurality of mobile devices includes a Bluetooth module. The Bluetooth module broadcasts a device name of a predetermined format. The device name of a predetermined format includes a user name and a uniform resource identifier. The Bluetooth module also receives, via Bluetooth device discovery, the device name of each of the other mobile devices. Each mobile device includes a filter. The filter determines that the device name of each of the other mobile devices corresponds to the predetermined format. The each mobile device of the system also includes a grouping module. The grouping module designates the mobile device to be the leader of a group based on the uniform resource identifier, which was identified from the device name of the mobile device. The grouping module may also provide a list of user names. The list of user names is identified from each of the device names corresponding to the predetermined format. The grouping module also forms the group by receiving a selection of one or more user names from the list.

In one embodiment, each mobile device of the system performs a login of a user to a server. In another embodiment, each mobile device of the system broadcasts the mobile device identifier in the broadcast of each mobile device's device name. The broadcast of the device name including the mobile device identifier is in the predetermined format. In another embodiment, the each mobile device of the system broadcasts the user's mobile telephone number in the broadcast of each mobile device's device name. The broadcast of the device name including the user's mobile telephone number is in the predetermined format.

In one embodiment, the filter of each mobile device of the system filters out any device name received during Bluetooth device discovery that does not correspond to the predetermined format.

In another embodiment, the grouping module of the system designates the mobile device to be the leader of the group. The designation is based on the mobile device's uniform resource identifier identified from its device name being lower alphabetically from any uniform resource identifier identified from device names of the other mobile devices.

In one embodiment, the system includes the grouping module of each mobile device designating each of the other mobile devices of the plurality of mobile devices to be a member of the group. The designation is based on the mobile device's uniform resource identifier identified in its device name being alphabetically higher than the uniform resource identifier of the mobile device.

In one embodiment, the mobile device transmits a group formed message to the other mobile devices via the server. The transmission may be responsive to a selection of the user names to form the group.

In one embodiment, the mobile device of the system receives the selection of one or more features of the group.

The selection is received from the user of the mobile device designated as the leader of the group.

In one embodiment, the mobile device of the system receives a request by the user to activate the formed group. The mobile device also transmits a message to a server to activate the formed group. The transmitted message is responsive to the request. Each of the plurality of mobile devices of the system receives an indicator that the formed group is active.

BRIEF DESCRIPTION OF THE FIGURES

The foregoing and other objects, aspects, features, and advantages of the invention will become more apparent and better understood by referring to the following description taken in conjunction with the accompanying drawings, in which.

In the drawings, like reference numbers generally indicate identical, functionally similar, and/or structurally similar elements.

DETAILED DESCRIPTION

Figure 1A:
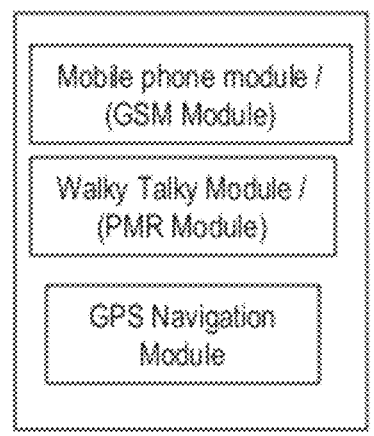
FIG. 1A is a block diagram of a multifunction mobile device, herein also referred to as the mobile device.

For purposes of reading the description of the various embodiments below, the following descriptions of the sections of the specification and their respective contents may be helpful:

Section A describes hardware architecture of the multifunction mobile device;

Section B describes software components of the multifunction mobile device; and

Section C describes systems and methods for creating a group and providing group related functions via mobile devices.

A. Multifunction Device Hardware Architecture

Prior to discussing the specifics of embodiments of systems and methods of audio roaming via the multi-function mobile device, also referred to as the mobile device 100 or a device 100, it may be helpful to discuss the environments in which this device may be used. The mobile device may be used by any outdoor enthusiast embarking on a trip in an environment in which he or she would like to utilize a rugged mobile telephone for voice and emergency communication, a rugged GPS navigator for identifying location information and a rugged walky talky for off net group communication with other users in the area. The mobile device may be used in any outdoor setting, such as mountains, prairies, deserts, swamps, lakes, woods, jungles or in any uninhabited area. The device may also be used in any weather and by any group of users, individuals or groups, such as families and friends on a camping or a cross-country trip, skiers and snowboarders, motorcyclists and globetrotters. Mobile device may be used in a fishing trip, a hunting trip as well as in boating, sailing and river rafting trips, jungle expeditions and safaris. An outdoorsy person may use the mobile device for a piece of mind and security of knowing that in case of an emergency he or she may, if necessary, have an access to a telephone, a walky talky, a GPS navigation system device, a light source, a device that connects to the internet, a compass or a device that reveals locations of any other users or persons in the area, all provided by a single multipurpose, multifunction handheld device.

The mobile device may provide a user or a group of users located in a remote outdoor setting with a means to communicate with each other. This device may further provide the users with personal GPS navigation functions and ability to locate other members of the group, may enable data connectivity and access to various activity related applications and internet services. In an environment in which the users may not have access to cellular telephone or cellular data coverage, mobile device may provide the users with a means of communication via radio frequencies open for civilian radio communications, such as for example (private mobile radio) PMR 446 operating at around 446 MHz frequency. In some embodiments, radio communication may be implemented via military or government use designated radio frequency ranges. Implementing the communication via the radio band may enable the users to communicate with each other without incurring excessive charges, such as roaming charges, from the mobile telephone service providers.

Referring now to FIG. 1A, an embodiment of a block diagram of a multi-function mobile device 100 is illustrated. The mobile device 100, or the device 100, may three main modules, such as the mobile phone module, walky talky module and the GPS navigation module. The device 100 may also include a power button, a display screen and a multitude of other function buttons. Mobile device 100 may be enclosed within a casing or an enclosure which may comprise a hard and rugged material. Display screen may enable the user to user various features of the device and view a graphical user interface. Mobile device may include any features of a portable navigation assistant (PNA) or a portable navigation device (PND). Mobile device may include any functionality of a global positioning system (GPS) device providing location, positioning and directions functions and features to a user. Mobile device may also include any portable hand-held multi-way radio transceiver functionality, such as any functionality of a hand-held walky talky device for communicating via a radio band. Mobile device may further comprise any functionality of a smart phone enabling a user to access the internet, check, send and receive emails or use any other web-based functions.

The enclosure of mobile device 100 may comprise any hard and/or rugged material for protecting the device, including any type and form of a metal, plastic or rubber. The enclosure may include any material or any combination of materials to protect the device from external elements including water, rain, wind, pressure, temperature, tension or compression. The enclosure may provide protection to the hardware components within the device and protect the display screen from any outside elements. The enclosure may enable the device to function upon being dropped, scratched or used in any harsh or stressful environment. Mobile device enclosure may comprise mobile device logo and/or mobile device related information, such as a company name or address. Mobile device enclosure may be compliant with IP57 and MIL-STD 810F/516.6&522 standards and may also be waterproof, such as for up to 1 meter depth under water and for a duration of 30 minutes. The enclosure along with the remainder of the device may be designed to withstand about 8 kV of charge in air and about 4 kV of charge in contact without damage to mobile device 100. Display screen of the mobile device 100 may include any type and form of display as described below.

Mobile device 100 may include any number of selection points, or joysticks which may be used by the user to operate the device. In some embodiments, mobile device includes an on/off button, a volume button, a speaker phone button or a telephone button. Mobile device may include a button to switch between modes of communication, such as the communication via a radio frequency and a communication via a cellular telephone communication or an internet data communication. Any number of function buttons may be included, such as: a docking button, an enter button, a menu button, an escape button, an out button, a go to button, an in button, a navigation button, a search button and a mark button. Mobile device may include any button or a selection feature to enable selection of any functionality or feature of mobile device.

Still referring to FIG. 1A, embodiments of functionalities of the multifunction device may include any number of features useful for a group of enthusiasts in an outdoor environment. A mobile device 100 may combine and include all the functionalities of a cellular telephone, a walky talky device and a hand held GPS navigation device. Mobile device may include any hardware, software or a combination of hardware and software of a mobile telephone device and for implementing mobile telephone functions. Mobile device may also include any hardware, software or a combination of hardware and software of a private radio communication device, such as a walky talky device. In addition, mobile device may also include any hardware, software or a combination of hardware and software of a GPS navigation device. Mobile device may implement any of the functionalities or features of the cellular telephone, walky talky or a GPS navigation device on a single device, thus implementing all of these functionalities on hardware and software of a single device.

Figure 1B:
FIG. 1B is an embodiment of a design of the mobile device.
Figure 1C:
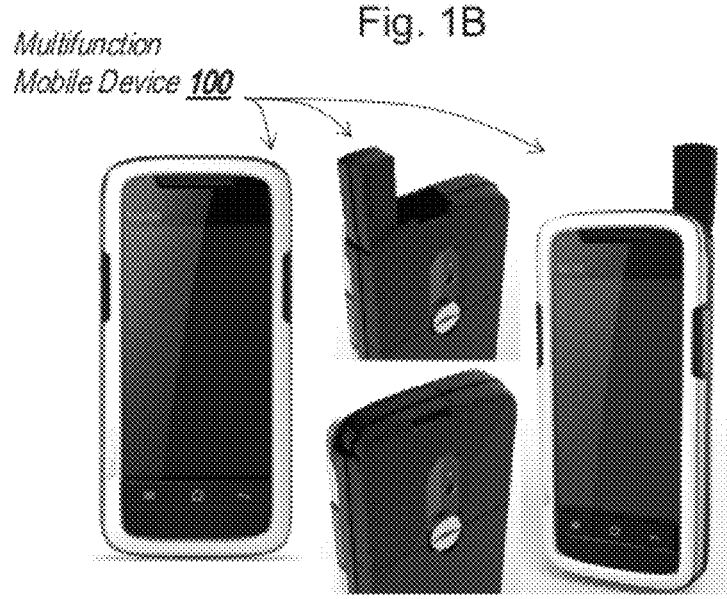
FIG. 1C is another embodiment of a design of the mobile device.

Referring now to FIGS. 1B and 1C, embodiments of an industrial design of a mobile device 100 are displayed. In FIG. 1B, the mobile device 100 may be designed to include functionalities of a smart phone, such as a smart phone utilizing Android operating system and software stack for mobile devices developed by Google Inc. In such embodiments, mobile device may include functionalities of an android smart phone in combination with functionalities of an outdoor navigation device and a walky talky device. Mobile device may comprise a speaker and a microphone for communication, one or more volume buttons, a power button, a menu button, a home button, a back up button and a PMR button. Mobile device may also include a carrying loop, a universal serial bus (USB) port, a PMR antenna along with an opening detail for the PMR antenna, a camera flash, a camera, a battery and a battery screw or mechanism for access. Mobile device may include a single antenna for all modules and communication protocols, including PMR, GSM and GPS modules and protocols or may include separate internal antennas for any of the modules.

Mobile device 100 may comprise overall length of anywhere between 10 and 200 mm, such as for example 10 mm, 20 mm, 40 mm, 80 mm, 90 mm, 100 mm, 110 mm, 120 mm 130 mm, 131.60 mm, 140 mm and 200 mm. Mobile device may comprise overall width of anywhere between 10 mm and 150 mm, such as for example 10 mm, 20 mm, 30 mm, 40 mm, 50 mm, 60 mm, 66.50 mm, 70 mm, 80 mm, 90 mm, 100 mm, 120 mm, 150 mm, 200 mm and 300 mm. Mobile device may comprise overall thickness of anywhere between 5 mm and 50 mm, such as for example 5 mm, 10 mm, 15 mm, 20 mm, 20.40 mm, 25 mm, 30 mm, 40 mm and 50 mm. Mobile device may comprise any weight between 50 grams and 500 grams, such as for example 50 grams, 100 grams, 150 grams, 200 grams, 230 grams, 250 grams, 300 grams, 400 grams, 500 grams, 600 grams, 800 grams and 1 kilogram. In some embodiments, mobile device includes dimensions of about 13 centimeters in height, about 7.5 centimeters in width and about 3 centimeters in depth and weighs about 300 grams with battery.

Mobile device 100 may include a resistive touch screen which may enable the user to communicate with the device by touching the features, buttons or options displayed on the screen. The device may also include function keys, such as the home, the menu and back keys of an Android mobile operating system by Google Inc. The volume keys may be used to adjust ringer, cellular telephone calls, such as GSM calls, radio band call, such as the PMR calls when mobile device is used as a walk talky, or even to adjust the volume of media or internet applications, such as audio/video files being displayed on the device. The power key may be used to power up the device and awake the device from the sleep mode. A dedicated PMR key may be used to switch to and from the radio frequency communication mode, or the walky talky mode, which may also be referred to as the PMR mode. Mobile device may include an aluminum frame as well as hard and soft plastic material along with a bumper, a retractable PMR antenna and a cap for the USB port.

Robustness of the mobile device may be according to any international protection rating, including IPx5 or IPx7. Mobile device may be designed to withstand extreme conditions including exposure to water, dust, extreme temperatures, drops, bending, twisting and vibration. Mobile device may be robust to satisfy IPx5 international protection rating or IPx7 international protection rating for protection against outside elements including water, temperature, dust, drops or shocks. In one embodiment, mobile device is water resistant in accordance with IPx5 and IPx7 standards. In a further embodiment, mobile device is dust resistant according to IPx5 standard and/or IPx7 standard. Mobile device may be resistant to a drop test on a concrete floor from a height of 1, 1.5 or 2 meters. Mobile device may also be resistant to stress induced by a barrel testing in which the device is tumbled from 0.5 meters within a turning metal barrel.

Referring to FIG. 1C, an embodiment of a mobile device with a PMR antenna pulled out is displayed. As the device may be switched between the cellular telephone mode and the walky talky or the PMR usage mode, the user may pull out the PMR antenna from the device to improve the reception of the mobile device during the PMR usage.

Figure 1D:
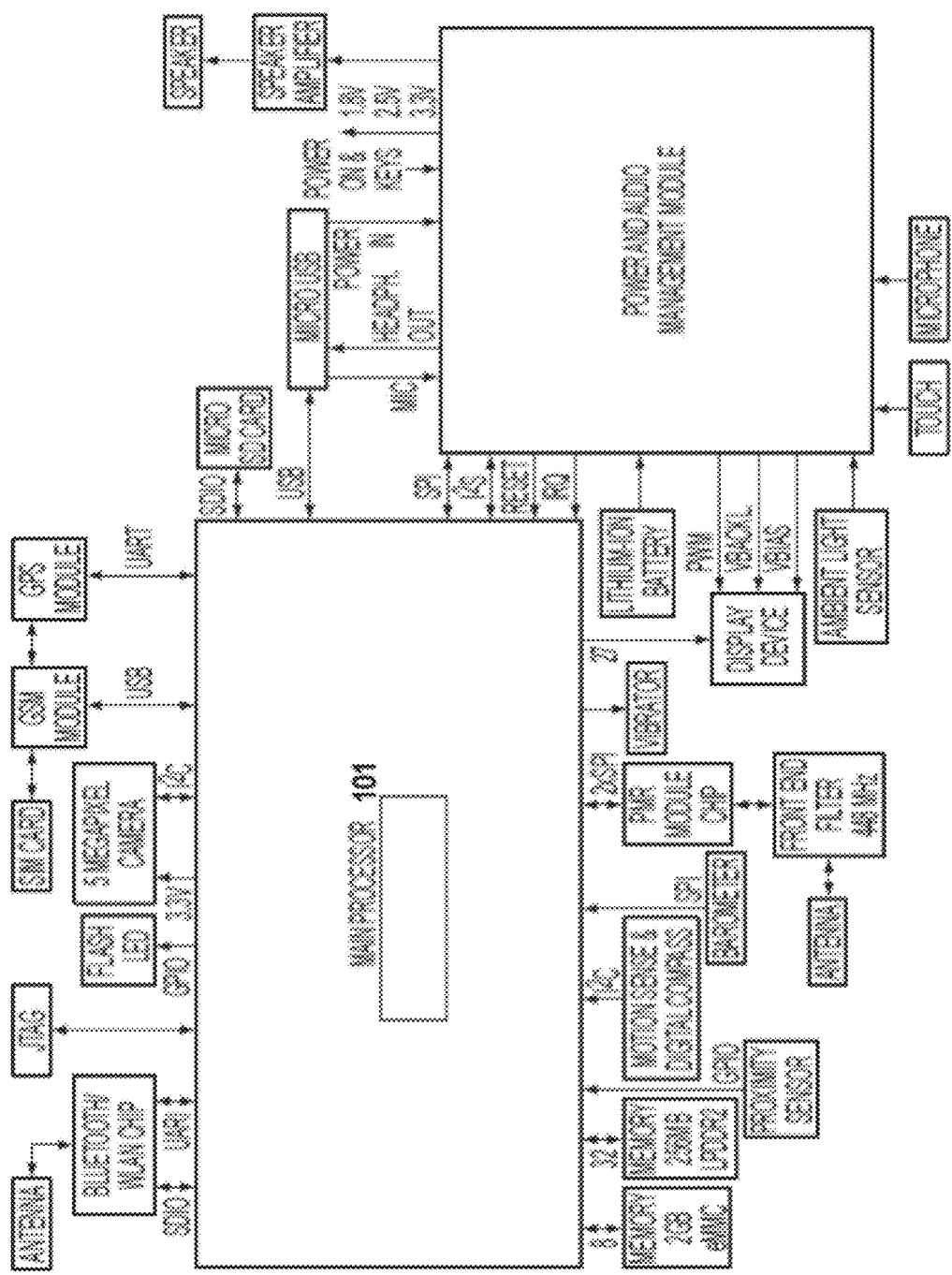
FIG. 1D is a block diagram of the hardware components of the mobile device.

Referring now to FIG. 1D, an embodiment of a mobile device hardware system is illustrated. Mobile device 100 system may include any number of integrated circuits, processors, memory, logic and computing units. Device 100 may include a central processing unit, also referred to as processor 101. The processor may serve as the main processor for the device and may be integrated with or in communication with any number of other units, functions, devices or modules. Mobile device 100 may also include a module for Global System for Mobile (GSM) and/or General Packet Radio Service (GPRS) communication. Mobile device 100 may further include a module for PMR communication, such as PMR chipset for radio wave communication, such as a walky talky communication. Mobile device 100 may further include a GPS module for GPS navigation and location. Mobile device 100 may further include any number of memory devices, such as a Micro Secure Digital (MicroSD) card interface as well as a Subscriber Identity Module (SIM) card interface, a MicroUSB connector, and memory such as low-power 256 mega byte low power DDR2 memory and 2 giga byte multimedia card (MMC). Power supply module may include a battery, such as Li Ion battery for 2700 mAh and power management circuitry for controlling or managing power, such as a power and audio management integrated circuit (IC). A visual display device, also referred to as display device 124, and may include a touch screen and one or more keys/buttons 126. A power supply, also referred to as power supply 116, may include power management circuitry, a Lithium Ion battery and battery control features. Memory devices may include cache memory interfaced via a bus which may have a faster response time than main memory.

In addition, mobile device 100 may also include a 3.5 inch display with resistive Touch Panel which may be used as display 124 for the device. A combined BT/WLAN chip for Bluetooth (BT) and Wireless Local Area Network (WLAN) communication may be provided as a Bluetooth and WLAN module. A JTAG standard text access port may be included into mobile device 100 for testing purposes. A vibrator module may also be integrated to enable the mobile device to be used on vibration mode similar to the vibration module of a mobile phone activated by a received communication or a phone call. A 5 Mega Pixel (MP) camera with autofocus and a flash light LED may be integrated into the system as well. The camera may include a digital zoom, such as a 3×, 5× or 10× digital zoom. Mobile device 100 may also include modules for a G-Sensor, an electronic compass, an electronic barometer, a barometric altimeter, a proximity sensor and an ambient light sensor. A speaker, such as a loud speaker may be interfaced with an amplifier to provide sufficient dB rating to withstand any loud outdoor environment and enable a user to communicate via a loudspeaker a distance of about 10-100 centimeters from the device.

Still referring to FIG. 1D in a greater detail, the main processor 101, or the central processing unit (CPU) may comprise any hardware or logic circuitry for processing instructions, commands, data, applications or functionality of the mobile device 100. CPU 101 may include any logic or functionality that responds to and processes instructions fetched from the main memory unit 122 or any instructions pertaining to any functions or user applications. The central processing unit may be provided by a microprocessor. Mobile device 100 may include any mobile telephone, smart phone or any mobile device processor or a CPU that may be used on a mobile device or is capable of operating as described herein.

Memory of the device may include one or more chips capable of storing data. Memory, which may also be referred to as the main memory unit 122, may include static memory and/or dynamic memory. Main memory unit 122 may include functionality to allow any storage location to be directly accessed by the microprocessor 101. Main memory unit 122 may include Read Only Memory (ROM), Erasable Programmable ROM (EPROM), Flash memory (NOR flash as well as NAND flash memory), Electrically Erasable Programmable Read Only Memory (EEPROM). Memory unit 112 may include Static Random Access Memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. The processor 101 communicates with main memory 122 via a system bus. Main Memory unit 122 may also include interface for external, user inserted memory, such as SD-Micro memory card which may be used by the user to add additional memory to the device. In some embodiments, Mobile device 100 supports Micro-SD cards of at least 8 GB in memory.

Memory unit may include memory designated for storing operating system functions, software, data, applications and functions. Operating system may include any type and form of mobile device operating system such as SmartPhone Operating System by Android Inc, Symbian operating system by Symbian Ltd., Microsoft Windows Mobile operating system by Microsoft Corporation, Moblin mobile Linux based open source operating system or any other operating system capable of performing functions described herein. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Software deployed on storage device may include any user selected or downloaded software as well as software or functions implemented by the operating system or mobile device specific functions or applications. Applications 120 may also comprise mobile device specific applications and functions as well as user specific applications or functions described herein.

Power supply module, also referred to as power supply 116, may include a battery and any logic, hardware and software for energy management of the device. The power supply 116 may also include functionality for charging or powering the battery. The power supply may include energy management functionality to adjust the power output so that mobile device's function is optimized with respect to the battery life. For example, power supply 116 may provide the USB ports with about 5V, even in the off state. The power supply may have a limit on the amount of current that may drawn at the same time, such as a limit of about 500 mA. Power supply 116 may comprise any type and form of a battery such as a lithium ion battery, nickel-cadmium battery, silver oxide battery or any other type of a device for storing electrical energy and providing such stored energy to a mobile device, such as the mobile device 100. The battery may act as a power supply for all of the mobile device modules, including the GSM module, PMR module or GPS module. The battery may be charged via a charging or communication interface, such as a USB interface, and may be charged with a charger, such as a standard USB charger. USB interface may include switchable 4-wire universal asynchronous receiver/transmitter (UART) across the USB interface. USB interface may also act as a connector, such as a 10 pin USB Micro-AB socket or cradle connector. For example, UART may be accessible via USB interface. In one embodiment, external rechargeable batteries, such as AA or AAA batteries may be used to power mobile device 100. External batteries along with any additional chargers or mounts may be provided as an additional accessory to the mobile device 100. The power supply 116 may include functionality for power management to ensure that mobile device 100 may have a stand-by time of about 72 hours and about 8 hours of combined usage time. The combined usage time may include about 30 minutes of GSM talk, 30 minutes of PMR talk, 8 hours of GPS turned on and every five minutes group status update in terms of about 20 kb of data via PMR or GSM.

Power Management circuits or functions may provide charging control, temperature control and power supply detection. Safety relevant functions regarding charging protection, temperature control must work independent of the processor or the operating system. In case that the device may not be charged due to the battery's temperature or limitations in the power supply, the device shall be entirely supplied from the power supply, such as the battery may not be drained. Any power management related parameters may be periodically updated to the API at a rate of no more than 10 s. Changes to the external power supply, such as disconnection of a host PC and connection of a charger may be dynamically detected in every power mode, at an update rate of no less than 5 s. When the external charger is connected, the charger may provide to mobile device battery 5V at 1 A. The device may be charged from 0% (i.e. below operation threshold) to 100% within 2.5 hours while it is suspended or off and within 3.0 hours, while the device is operated. When the device is connected to a host PC, there may be no charging time requirements if the device is running. If the device is switched off or is in a suspend mode, the battery shall be charged within max. 3.0 hours and the device shall draw no more than 500 mA from the host PC.

Device power management circuitry may include functionality to enable power-up of the device only if the integrity of the system supply voltages are ensured. This may allow for proper selection of a battery voltage threshold used to make the decision whether or not to allow a power-up sequence. In case of an attached external power source, the power management architecture may allow direct supply of the device from that external power source and may support immediate power-up, independent of the battery charging level only, if memory and system integrity can be guaranteed even throughout a sudden power loss. The power management architecture may only allow a device boot-up process if the remaining battery power allows completing a boot-up sequence. In particular, any sequence of cyclic power-up attempts may be avoided. For example, a battery power may allow a boot-up of the device. As the boot-up process starts, the battery voltage may drop below operation level due to the increased operation current, which may cause the device to shut down during boot-up. After shut-down the battery level rises again above operation boot-up threshold and the procedure would start over. This behavior may be avoided via the above mentioned power management function. The operating system may monitor the charging status of the device. Charging of the battery may be limited to a temperature range in order to ensure safe charging and the safety of the device. As such, overcharging protection function may be provided to interrupt the charging process should the battery voltage exceed the voltage limit or should the charging time exceed a time-out value defined in the charging circuitry. Battery power management may include the functions for resetting mobile device 100. A soft reset may reset the processor of mobile device in which data and memory integrity are ensured. Memory caches may be cleared and drivers may be stopped as well as memory controllers. Hardware reset may be done to temporarily disconnect power from all circuitry of the device. A hard reset may be done to bring mobile device settings back to the factory settings.

Display screen or display device 124 may include any type and form of a display device. Display device 124 may be a liquid crystal display (LCD), a light emitting diode (LED) display, an electroluminescent display (ELD), a thin film transistor (TFT) display, an organic light emitting diode (OLED) display, a quantum dot light emitting diode display (QDLED) or a nano-crystal display or any other type and form of display which may be used on the device. Mobile device display may comprise a touch screen that may detect the presence of a location of a touch by a user, thus enabling the user to select features, buttons or points on the display by touching a given section of the display. Display may include any size or resolution, such as HVGA resolution of about 320 by 480 pixels or QVGA resolution of about 320 by 240 pixels. In one embodiment, display 124 includes a trans-flective TFT HVGA display with a contrast ratio of about 300:1, luminance of about 350 cd/m2 and color depth of 16 bits per pixel (bpp). The display may display the user's location, location of other users and a list of users. The display may also display coordinates, direction or a position of the user's location, coordinates, direction or a position of locations of other users or any of the GPS or navigation related functions. The display screen may illustrate the time via a clock, battery related information or any other device related information. The display may provide the user with the graphical user interface as well as enable the user to communicate with the device and to select various functions of the device. Display device may also include a backlight which may be dimmable from 0%-100% in 16 steps of % 6.25 each via CPU/Application.

Interfaces for communicating with external network devices may be collectively termed the network interfaces of mobile device. Network interfaces may include any hardware, software or drivers for enabling the mobile device to communicate with a network or another computing device. Network interfaces may also include hardware, software or logic for enabling mobile device to communicate with an external device via a wired or wireless connection, including a USB connection, Bluetooth, WLAN, PMR, GSM/GPRS, GPS or any other communication technique. In some embodiments, network interfaces enable the mobile device to communicate via worldwide interoperability for microwave media (WiMAX) communication protocol. Network interfaces may enable mobile device to send and receive communication via any frequency range and via any communication protocol including: high speed packet access (HSPA), high speed downlink packet access (HSDPA), high speed uplink packet access (HSUPA), evolved high speed packet access (HSPA+) or any other mobile telephone protocol capable of operating as described herein. Furthermore, the network interface may include functionality to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface may comprise or provide functionality for a built-in network adapter, network interface card, PCMCIA network card, card bus network adapter, wireless network adapter, USB network adapter, USB socket, a modem or any other device suitable for interfacing the computing device 100 to any type of network capable of communication and performing the operations described herein. Network interface may include a USB interface for communication with external devices or for charging mobile device battery. USB interface data lines may be switchable between USB mode to support the hardware flow control signals of a 4-wire UART interface including request-to-send (RTS) and clear-to send (CTS) functionality. Switching may be implemented upon detection of a connected device via a pin of a Micro USB socket.

Network interface may include functionality for detecting any external devices being connected to mobile device 100. Network interface may include functionality to respond to the device and establish communication. In one embodiment, network interface includes a USB interface that is designed according to the specifications of the USB Organization. In such an embodiment, when a device signals its presence to a host device by pulling one of the data lines high, the device may record and respond to communication requests of the host. If the device cannot respond to host PC communication requests in time, e.g. during the cold boot process, the initial signaling to the host device must be delayed until the device is ready to respond to the host communication requests. When the device is being suspended while it is connected to a host PC, the device may execute a virtual disconnect, in order to inform the host PC that the device is not able to respond. After resuming from suspend, the device shall inform the host device that the device is available again.

The speaker may be a 2 Watt mono speaker of about 36 mm membrane diameter. Mobile device 100 may further include or be configured with an earpiece, such as a standard earpiece for mobile telephone communication. The speaker may be interfaced with the housing to enable stability and acoustics for efficient output. The frequency range of the speaker may be 500-10000 Hz at −5 dB range. Sound pressure level may be 86 dB measured at 1 m with less than 10% total harmonic distortion across a frequency band of at least 1 kHz in the frequency range between 2 kHz and 4 kHz.

Mobile device may include a microphone for communication in an outdoor and mobile environment. The microphone may be integrated for voice recognition and may be sampled with 16 kHz signal in 16 bit quality of voice recognition. The microphone may be separated and isolated in a rubber enclosure to decouple any low frequency interference and be separated from motherboard electronics, vibrations or noise.

A mobile communication module of the mobile device 100, which may also be referred to as the GSM module, may include any hardware and software to support any standard 2G, 2.5G and/or 3G communication via GSM, GPRS and/or EDGE protocols. The mobile communication or the GSM module may include customized logic and/or functions. The mobile communication module may also support communication via code division multiple access (CDMA) or time division multiple access (TDMA). The mobile communication module, herein referred to as the GSM module, may include functionality to support high speed downlink packet access (HSDPA) for 3 G communication. GSM module may include adaptive multi rate (AMR-NB) audio codec and multi slot class (MSC) with at least 4 TS downlink and 2TS uplink Pv4 support. GSM module may include functionality to support WiMAX communication. GSM module may also include functionality for enabling the mobile device 100 to communicate with a server, such as the server of a mobile network provider, a proxy server, a cache server or any server or a network device providing access to the internet. In some embodiments, GSM module may comprise functionality to act as a server communicating with other mobile devices 100 via a transport layer protocol, such as the internet protocol (IP).

GPS module may include any hardware and software for location navigation and detection. GPS module may include a receiver which may include wide area augmentation system (WAAS). The GPS module may be differential-ready and may include 12 parallel channels. GPS module may include a power input: 7.2.1, antenna: internal and update rate of 1/second which may be continuously updated. GPS module may include GPS radio frequency (RF) of about 161 dBm sensitivity, which may be front end filtered and provide location accuracy of about 1 meter from the target location. GPS module may also include differential global positioning system capacity along with WAAS functionality. GPS module may be accurate to about 20 meters, 10 meters, 5 meters, 3 meters, 2 meters or 1 meter with about 95% variation with or without any DGPS corrections. GPS module may include velocity accuracy of 0.1 meter/sec at steady state and may have acquisition time of anywhere between 1 second and 60 seconds, such as 3 seconds, 32 seconds and 39 seconds. GPS module may include functionality to provide accuracy of location detection of about 1 meter or in minimum comparable equal or better than best in class competitor device, such as for example navigation system Garmin 550T.

For optimum GPS reception special care may be taken to minimize any unwanted radiation from the device (self interference) to a level which will not degrade the GPS sensitivity, compared to a reference receiver of the same model and make as utilized in the device. Appropriate mass production stable shielding technologies and filtering methods may be applied to the design to ensure that connecting the device to a holder of the user will not degrade GPS performance. In some embodiments, GPS patch-Antenna may include a size of about 25 mm by 25 mm by 2 mm. If GPS receiver works as stand-alone solution (non host based), National Marine Electronics Association (NMEA) signal output may be sent to serial port of CPU. NMEA may include electronic and data specification for communication between GPS devices. GPS module performance in terms of Time To First Fix (TTFF) may be less than 60 seconds for a cold start and less then 5 seconds for a hot start using Mobile Navigator (MN7) application. The ratio of the power level of the signal to the noise conducted or radiated noise generated by the mobile device may be less than 1.0 dB, while device is playing a video (dynamic video content visible on screen) located on the removable memory device and also located on internal flash. The front end of the GPS receiver may include filtering which reduces possible interference from a SIM module or GPRS module which may be attached to the rear docking interface to a level that does not lead to noticeable performance degradation of the GPS receiver, both during acquisition phase as well as during tracking phase.

PMR module may include hardware and software for radio frequency communication. PMR module may include any functionality for implementing two way communication via radio waves, such as walky talky or PMR communication. PMR interface may include hardware or logic for implementing and using two-way radio communication via any frequency range. PMR interface may further comprise an antenna for the PMR communication. PMR interface may include functionality to transmit and receive information at any frequency in the radio frequency range, such as between 30 kHz and 300 GHz. In some embodiments, PMR interface may include functionality to transmit and receive information at frequencies between 1 MHz and 1 GHz, such as for example at any communication channel between 446.00 and 446.20 MHz of the European Private Mobile Radio (PMR) 446 radio frequency range, at any channel between 476.425 and 477.400 MHz of Australian Ultra High Frequency (UHF) Citizen's Band (CB) radio frequency range, at any channel between 462.550 and 467.725 of the General Mobile Radio Service frequency range for the FM UHF radio service in the USA or any other radio frequency range that may be used by a walky talky, a two way radio or any other radio frequency range wireless communication device.

PMR interface may include any logic, hardware, software or firmware to provide the functionality for implementing PMR radio communication and/or Bluetooth wireless communication. Bluetooth functionality may also include non-host CPU based advanced error reduction/noise reduction (AEC/NR) features. PMR module may include any number of channels between 1 and 100, such as for example 8 channels. PMR module may include functionality to communicate via any UHF frequency range, such as at around 446 MHz and may include logic and functionality for communicating via PMR 446. PMR module may include the functionality for squelching unrelated radio communication, such as continuous tone-coded squelch system (CTCSS) codes. In some embodiments, PMR module includes 38 CTCSS codes. PMR module may have a range of anywhere up to 100 km, such as 21 km or 5 km. PMR module may have radio power output of RMR 0.5 W and may have external or internal antenna. PMR module may include functionality for transmitting voice as well as data. Bluetooth functionality may support Bluetooth 2.0 High Speed as well as lower speed communication in addition to supporting WLAN communication. In some embodiments, PMR module and interface include functionality for supporting WiMAX communication of the mobile device with other devices.

Mobile device 100 may operate at any temperature, such as between −10 Celsius and 60 Celsius and may be stored at any temperature between −20 Celsius and 80 Celsius. Mobile device 100 may support GSM/EDGE bands at any number of frequencies, including 850 MHz, 900 MHz, 1800 MHz, 1900 MHz and 2100 MHz. Mobile device may enable communication via PMR radio, a two-way radio or walky talky device, via GSM/GPRS, WiMAX for any distance range, such as for example 1 km, 2 km, 3 km, 4 km, 5 km, 6 km, 7 km, 8 km, 9 km, 10 km, 11 km, 12 km, 15 km, 20 km, 25 km, 30 km, 50 km, 75 km, 100 km, 150 km, 200 km, 500 km and 1000 km. PMR application may enable the user to communicate to other standard PMR446 Walky Talkies. In some instances, PMR application may enable the user to communicate to any other two way radio or a walky talky regardless of the frequency or channel. In particular the application provides guidance to adjust the channels and other PMR specific settings (like Voice Activation, Voice Scrambling and Roger Beep).

Mobile device 100 may include sensors, indicators, accelerometers, light emitting diodes or devices (LEDs) or buttons. Air pressure sensor may be used as a barometric sensor or barometric altimeter. Barometric altimeter sensor or barometer sensor may comprise any hardware, software or a combination of hardware and software for measuring the pressure of the ambient air and/or determining altitude or height above the sea level. Barometer may comprise functions, algorithms, executables or programs. Barometer may include functionality for measuring air pressure as well as algorithm for calibrating and adjusting the readings for temperature effects.

An accelerometer may be any device measuring acceleration of the device. Accelerometer may be used for display rotation as well as for games. Hall-effect sensor 3-axis may be used for electronic compass. Proximity sensor or ambient light sensor may be used for control touch and display brightness adjustments. Proximity sensor may be used to recognize a user's hand approaching mobile device 100. The range of the sensor may be between 1 and 20 centimeters from the device. The measured distance may be reported via 4 bit linear value to an application programming interface (API). LED flashlight may be of any power and may have any luminescence range of a standard outdoor flashlight, such as between 10 and 100 lumens. Mobile device may include indicators, such as LED indicators which may indicate power state or charging. These indicators may have luminance within 10% of each other, so that they appear even in intensity. Buttons, such as power button may be designed to require a specific amount of force in order to turn on or off the device, to avoid any accidental triggering. In some embodiments, power button may require between 2 and 2.5 N of force, such as 2.2 N, in order to turn on or off the device.

Functionality for minimizing interferences may be provided for speakers and/or microphones in order to improve clarity and efficiency. A high pass filter may be provided having characteristics of electrical audio path such that audio signals below about 300 Hz do not cause strong audible distortions at low. Furthermore, certain properties of the speaker frequency response may require manipulation. The platform may offer means to attenuate those frequencies with minimum of about 12 dB/octave below the (adjustable) cut-off frequency, as well as at least three configurable bandpass or band reject filters, e.g. by means of a codec with equalizer functionality. Filter settings may be made accessible to the customer via API, for means of audio tuning. The hardware and the API may support at least volume settings in steps of 1 unit between 0 (mute) and 100 (Maximum volume setting). The resulting audio volume may be monotonically increasing with increasing steps. The linearization of the volume steps may be done as part of the navigation application by means of a mapping table, which associates each of the 10 volume steps in the application to one of the 101 volume steps in the audio driver.

The device shall support full-duplex handsfree telephony. In order to achieve excellent handsfree audio quality the device shall include echo cancellation and noise reduction techniques. The speaker volume during handsfree conversation may allow conversation at vehicle speeds of 130 km/h in a medium class car, such as a VW Golf 4 on a dry road. In this scenario, the far end party may not hear significant audio artifacts while the other party talks. Besides measures mentioned under paragraphs "Audio input" and "Audio output", the distance between speaker and microphone inside the housing may be maximized. This shall minimize acoustic coupling between speaker and microphone through the housing volume. The device may include mechanical measures to ensure no audible variations in echo cancellation performance over mass production, e.g. airtight sealing of speaker back volume and sealing of speaker/microphone front against housing to control audio leakage between microphone and speaker. Furthermore, the echo cancellation method and/or the audio attenuation between speaker and microphone may be powerful and precise enough to suppress audible feedback and/or audible artifacts.

B. Software Platform

Figure 2A:
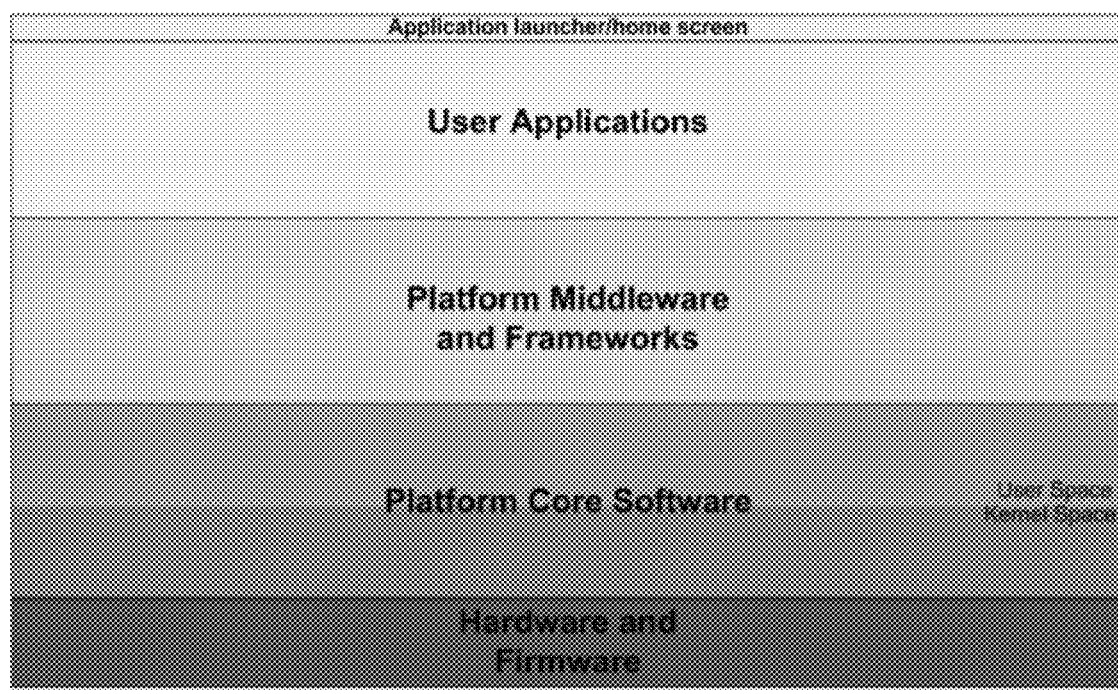
FIG. 2A is a block diagram of an embodiment of a firmware/software platform of the mobile device.

Referring now to FIG. 2A, an abstract overview of a mobile device platform architecture based on a modular operating system is illustrated. The operating system may include any type of mobile operating system, such as a SmartPhone Mobile Operating System by Android Inc. The system architecture may support multitasking applications and services environment. From a broad perspective, the mobile device may include hardware components as described above in connection with FIGS. 1A-1E. The hardware devices may be controlled by fixed firmware programs and data. Firmware programs and functions may include programs, executables or functions which manager and run operations of the hardware enabling the hardware to perform the given functions. Platform core software may execute based on the hardware and firmware and may be divided between the kernel space and user space. Platform middleware and frameworks may operate on top of the platform core software. User applications and application launcher or home screen may execute on the top layers and utilize any of the middleware, frameworks and the platform core software.

Figure 2B:
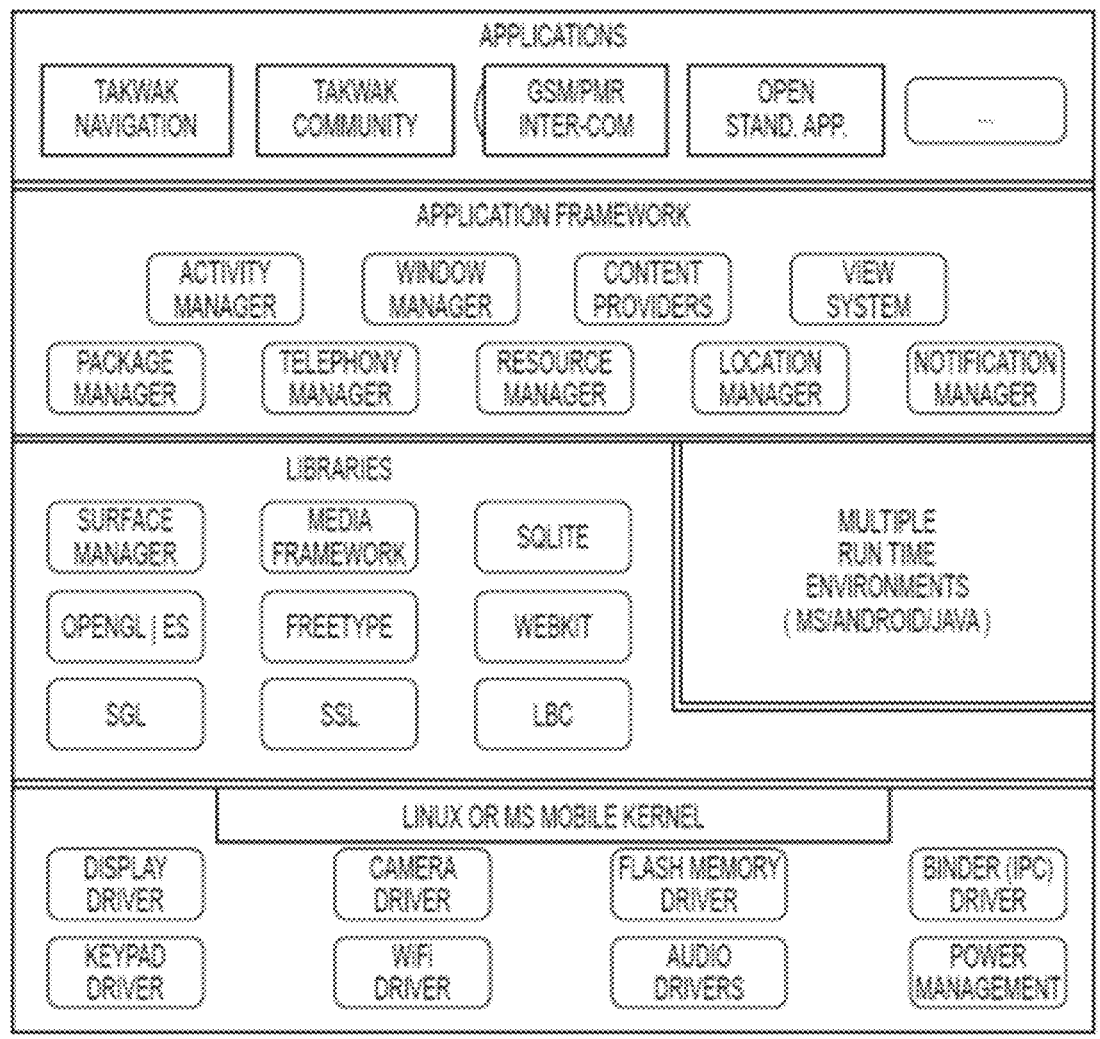
FIG. 2B is a block diagram of another embodiment of the firmware/software platform.

Referring now to FIG. 2B, an embodiment of mobile device 100 platform architecture is illustrated. At the lower level Linux or Microsoft Mobile Kernel may host a number of drivers for controlling hardware components or functions. Drivers which may run within the mobile kernel may include: a display driver, a camera driver a flash memory driver a binder (PC) driver, a keypad driver, a WiFi driver, one or more audio drivers and a power management driver. There may be multiple run-time environments operating, such as Microsoft, Android or Java environments. Libraries may include surface manager, media framework, an embedded relational database management system, such as SQlite, a graphics library, such as OpenGL, a font rasterization engine, such as FreeType, a layout engine for web browser to render pages, such as a WebKit, a 3D library for the OpenGL, such as SGL, and a C language library, such as Libc. Application framework may provide framework for running any range of applications, such as: Activity Manager application, Window Manager application, Content Providers application, View System application, Package Manager application, Telephony Manager application, Resource Manager application, Location Manager application and Notification Manager application. Applications, such as Mobile device Navigation, Mobile device Community, GSM/PMR Inter-Com and Open Stand Application may operate on top of the Application Framework.

The platform may also include any number of codecs, such as media codecs, such as AMR-NB audio codec for real-time encoding/decoding, streaming, file format, PCM audio codec for playing and recording, MIDI audio codec, MP3 audio codec, JPEG image codec and MPEG2 video codec. In addition, mobile device may also include any number of other codecs for displaying graphics, audio or video.

Applications may be preinstalled on mobile device 100. Applications may include mobile device settings application, telephone call log application, contacts application, camera application, messaging application, alarm clock application, web browser application, calculator application, music application, calendar application and maps application. In some embodiments, third party applications may be used or installed on mobile device, such as applications for turn by turn navigation for roads and streets, geo-caching applications, such as games, sun and moon information applications, low and high tide information applications, area calculations and others. The Software Application platform and the user interface (UI) may provide access to a community application market to download further applications or to get access to new services. In some embodiments, to enable such access, the device may be binary compatible with other Android Devices. The device with all applications loaded, including the core, mobile device and third party applications may pass the Android Compatibility Test Suite (CTS) as defined in the Android Compatibility website.

On top of the "generic" open OS and standard Software Application/Feature packages which may be able to be used without having the mobile device specific software features and applications implemented/embedded, all other specific software functionality may be implemented by mobile device. Such mobile device specific applications may include: Group Communication application, Group Navigation application and the applications for the use of mobile device as a standard PMR walky talky as well as transmission of data via PMR module.

Figure 2C:
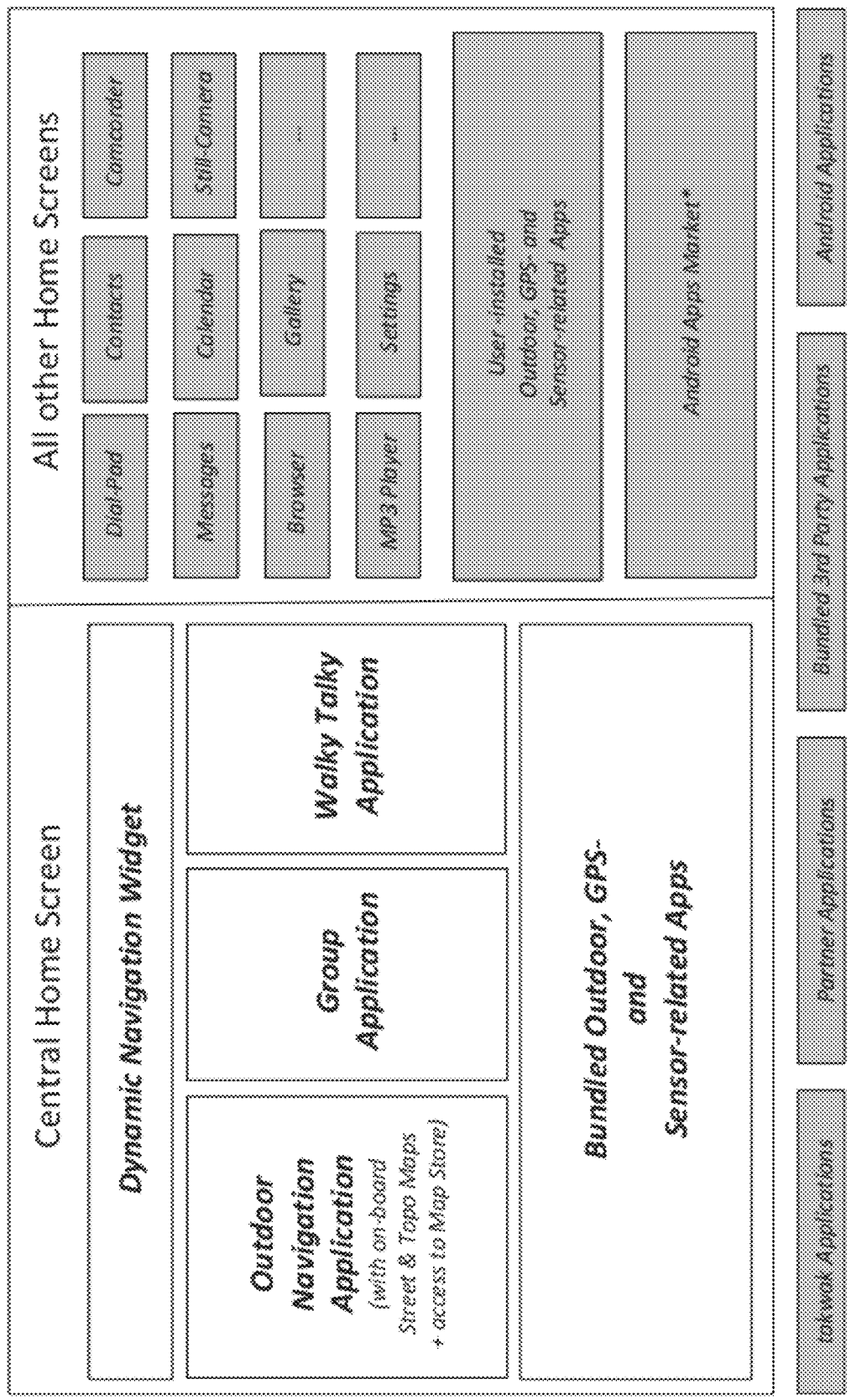
FIG. 2C is a block diagram of an embodiment mobile device applications.
Figure 2D:
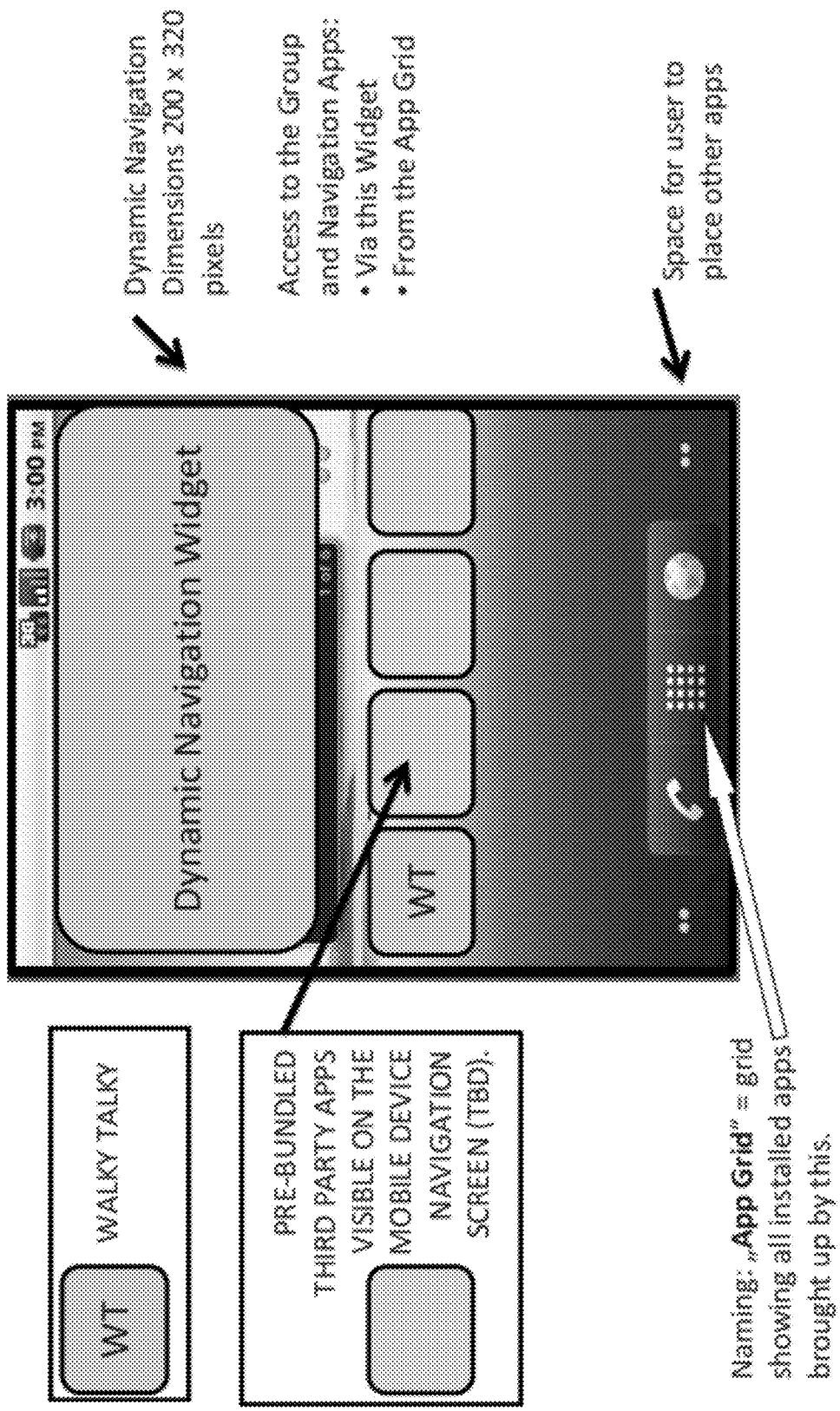
FIG. 2D is an embodiment of displayed mobile device applications.

Referring now to FIG. 2C, an embodiment of mobile device applications along with their home screens is illustrated. In brief overview, a central home screen may include a dynamic navigation widget, an outdoor navigation application, a group application, a walky talky application and a bundled outdoor GPS and sensor related applications. Other home screens may comprise applications such as dialpad, contacts, camcorder, messages, calendar, still-camera, a web browser, gallery, mp3 player, settings or any other additional applications. User-installed outdoor, GPS and sensor related applications and Android market applications may also be installed. In addition, device may further include mobile device applications, partner applications, bundled $3^{rd}$ party applications and Android applications.

In further overview of FIG. 2C, dynamic navigation widget may include functions, algorithms, programs or interface for navigating through the applications or interfaces of the mobile device. Dynamic navigation widget may include a user interface or any graphical representation of the mobile device functions. Dynamic navigation widget may include functionality to enable a user to interface with the device and scroll through the screens of the device to select the applications or features of interest. Dynamic navigation widget may include links or triggers to functions the user may select. The functions selected may be any functions on the mobile device 100.

Dynamic Navigation Widget may be a widget and may be positioned on the central home screen of the mobile device and it may display most updated or actual status information from the Outdoor Navigation and Group Applications. The information displayed within the Dynamic Navigation Widget may depend on the current usage mode (such as, navigating alone or in a group), the Outdoor Navigation operation in progress (such as, recording a track, navigating to a target) and the group navigation mode selected (such as, seek member, follow me, direct all).

Outdoor navigation application may include functions, programs, algorithms and interface for using and displaying GPS navigation. Outdoor navigation application may include GPS navigation features and functions and may operate using the GPS module and its functionalities. Outdoor navigation application may include libraries of maps, coordinates and sites information. Street and topographic maps may be stored in memory and additional maps may be purchased through online stores for mobile device applications. Outdoor navigation application may include functionality and features to inform the user of the user's present location via coordinates. In addition, the application may provide the user with information regarding the user's altitude. Outdoor navigation information may further include functions for monitoring and updating weather information and weather forecast. Outdoor navigation information may enable the user to track coordinates or movements of other mobile device users, such as for example the members of the group. Using this application, the user may monitor locations and movements of other users or group members in the area.

The Outdoor Navigation Application may include any functionality of the Scout application for iPhone made by MagicMaps, with the notable addition that the Open Street Map (OSM) base map data are stored onboard the device. Maps User may select between Open Street Map (OSM) and topographical maps. Maps may be stored locally on the device and may be available regardless of connectivity. User can install/de-install hundreds of OSM regions for the whole world at will (OSM map material is free of charge). User may get one free topo map from MagicMaps and can buy more on demand. Purchasable topo maps may cover a region of any size, such as for example 200 kilometers squared. Outdoor navigation to a target may be supported by graphical instructions or spoken instructions. A user can customize the displayed data such as speed, distance, average speed using a Tacho functionality. The user may track himself (track is stored in tours). The user can download tours from others (commercial or community content) using Tours functionality. Tours can be rated and provided with further attributes (suited for, scenery, etc).

Group application may include functions, programs, algorithms and interface for providing means for monitoring, tracking and maintaining contact with other members of the group. Should the user using mobile device be a member of a group of mobile device users in the surrounding area, the user may use the group application to maintain contact with the members of the group, to gather information about their presence and movements and to share information with other members. Group application enables the users to freely roam an area, such as woods or a jungle, being able to stay in contact with any other member or with the group as a whole. Group application may include information and links to any of the members of the group, enabling the user to select the user should a phone call or a walky talky communication be needed. The user may also acquire coordinates or view a map of a location of any of the users, thus enabling the user to find the remaining members of the group, should it be necessary. Group application may be interfaced with other applications. For example, a user may select another member of the same group and view the location of the other member using the outdoor navigation application or establish a contact with the member using the walky talky PMR radio communication.

Group application may be an application that allows forming groups with owners of other mobile devices and following their location and presence on the map of the Outdoor Navigation Application. Such location and presence data may be transported via the GPRS/EDGE network and a dedicated mobile device Group Server. The application may provide various navigation options. One such option may be a Seek Member option in which one or more members of the group wish to follow another member. Another option is a follow me option in which all members are invited to follow one member. Another option is a direct all option in which all members are invited to be directed to one joint target. In addition, the Group Members can communicate to each other via the PMR functionality and can instantly share objects like instant messages, photos, sound recordings and tracks with individual group members or with the whole group.

Walky talky applications may include functions, programs, algorithms and interface for communicating via radio frequencies. Walky talky applications may utilize PMR module to establish communication and data transmission with other mobile device users via radio frequencies, including the PMR dedicated frequencies and channels described above. Walky talky application may enable the user to talk to other users using a channel which may be accessible to all the users in the area. In some embodiments, the channel may be accessible only to the two users communicating. Walky talky application may be used for transmitting data or information between two mobile devices. The data or information may include any information or data described herein, including the GPS coordinates of users and data of any applications or functions described herein.

In some embodiments, information about the coordinates or location and presence data for the GPS navigation applications among members is transmitted via digital PMR. In some embodiments, information about GPS coordinates or location and presence data may be transmitted via GPRS/EDGE and/or the mobile device Group server. In such embodiments, users operate the Group application in areas without cellular network coverage (and free of charge). Voice communication via mobile device Group server (push over cellular technology) may allow the users to have voice communication with their group members over longer distance than what is enabled by PMR (data transport cost is incurred for group communication).

Bundled applications may include any collection or group of applications for the user, including applications for sensors, such as the barometer, barometric altimeter, compass, accelerometer, and proximity sensor. These applications may enable the user to access applications for configuring or setting these sensors. In some embodiments, the user may use one of the bundled outdoor applications to access an application for the barometer or the barometric altimeter. In some embodiments, the user accesses a compass application in order to use a compass for orientation and navigation purposes.

Barometric altimeter application may be used for determining a height above the sea level, such as for example in mountain climbing expeditions. A barometer sensor of mobile device 100 may be interfaced with a sensor manager which may process the signal from the sensor. Sensor manager may convert the barometer sensor input signal into a signal that may be proportional to pressure on a pressure scale such as Pascal. The barometer may be calibrated for pressure and temperature. The barometer may be calibrated to compensate for any variations in reading due to change in temperature. As such there may be adjustments made to barometer or to the altimetric measurements based on the ambient temperature of mobile device and this change may be implemented in the system and unnoticed by the applications. Thus, a navigation application displaying the location coordinates and the altitude may use most correct of the barometer or the GPS altitude data to determine the altitude of the user carrying the mobile device. In some embodiments, mobile device may determine the barometer readings based on the more correct of the GPS altitude data or the barometer sensor.

Barometric altimeter may be calibrated or zeroed in order to more accurately perform measurements. Barometer may provide more correct measurement than the GPS signal as GPS altitude value may invariably jump with a greater degree of error. This reading may be stabilized using the barometer sensor and an application that uses the barometric reading to determine the latitude rather than reading from the GPS signal's estimation of altitude. The application may determine the latitude using the barometric sensor readings. However, the barometer may be zeroed based on some recent valid GPS data. In one embodiment, an algorithm continuously monitors GPS precision with sliding time window. If GPS error remains below a specific threshold for error percentage for a predetermined duration of time, the algorithm may use the GPS barometric value to zero the altimeter with average value altitude reading over this time. For example, if GPS error remains below an error percentage threshold, such as below 1% for a duration of 30 seconds, the algorithm may average the GPS barometric value and zero the barometric altimeter reading using this value. Zeroing may entail replacing the previous value of the barometer sensor with the new value. Using this method, in instances in which the GPS readings have low error percentage the barometric altimeter readings may be more accurately determined. Alternatively, in some embodiments, more accurate barometric readings may be determined using GPS altitude data for low error GPS readings using the same or a similar algorithm.

As such a GPS unit may receive a barometer related reading using GPS altitude precision and the algorithm may use this altitude to determine or estimate the barometric reading. However, should GPS module detect a low error reading for a duration of time, barometric sensor may be zeroed with the GPS reading and applications may use the new value for the barometric readings. As such, the GPS navigation application, such as LocationProvider may use the most correct barometric reading, whether that be from the barometric sensor device or the GPS altitude signal.

In some embodiments, a user may know his or her precise altitude and may use that value to correct the altitude value on the system. The user may have an independent barometer and may use the read value to update mobile device system. In that case the user may input the barometric reading and mobile device may calculate the most correct altitude. Mobile device may then use this altitude for determining future changes in altitude. Alternatively, the user may enter the altitude using more accurate GPS coordinates. Mobile device may determine the barometric value from this input. In some embodiments, a server containing an elevation model may update the mobile device with the latest elevation values. In some embodiments, when a user explicitly zeros the altimeter, automatic zeroing based on good GPS data may be suspended for a duration of time, such as for example two hours, three hours, four hours or five hours.

A compass application may be used to determine the accurate direction to true north from a magnetic sensor's output. A 3 axial magnetic field, strength values adjustments may be made for the orientation of the device in the gravitational field and the delta between the magnetic and true north at the present location. For the orientation of the device in the gravitational field an input from a g-sensor may be used. To determine the delta between the magnetic and true north at the present location information from GPS and/or a model of the globe may be used. Android system may include a legacy Sensor Type which may implement the G-sensor adjustment, to the return magnetic north. In some embodiments, this feature may be used by the Mobile device apps. In some embodiments, deviation between the magnetic north and the true north may be ignored. However, the magnetic north to true north difference may be very small, such as under 10 degrees in some regions. As showing north may not require high accuracy for some applications, magnetic north may be used as the true north.

An electronic compass may get influenced by magnetic fields in the environment, such as near machines or cars. Often this may affect the readings of the magnetic field sensor. This fixed offset can be calibrated out by using the sensor in a special mode (self-test mode) and getting the user to move the device in a certain way (e.g. figure of 8, rotate around 2 or 3 axes). In some embodiments, when a user notices the compass is not correctly calibrated (e.g. not in line with user's knowledge where north is), they are given the option to initiate calibration. This option may be added to the settings core application. The exact method of calibration may depend on the type of compass and the system.

Other home screens may include applications for user specific communication, such as dial pad for dialing a mobile telephone number or contacts for selecting the telephone number from an electronic phone book. Messages application may be used for SMS or MMS messages to another mobile phone. Camcorder or a still-camera may be used for taking photos or videos from the area. Gallery and MP3 player may be used for playing or viewing multimedia files, such as audio or video files. User installed outdoor, GPS and sensor-related applications may include any outdoor applications which may be used for GPS or sensors of mobile device, such as for example additional maps, additional interfaces for compass or barometric altimeter. The user may also gain access to Android applications market to download any additional applications from an application store.

Mobile device applications, partner application, bundled third party applications and android applications may include any additional software applications which may be used on mobile device. In some embodiments, third party applications may be used, such as for example Android applications from 3rd party developers that may be pre-bundled. Such applications may include solutions for specific activities or outdoor related interest, like skiing maps, snow & weather report, sports related applications with connection to heart rate belts connected by Bluetooth, etc. Furthermore the user can download (free or commercial) Android applications serving his needs from Google's Android Market or other marketplace for Android applications like Androidpit or Handango.

FIGS. 2D-2L present example embodiments of user interfaces displayed on the mobile device as the user utilizes the functions and applications of the mobile device 100, such as any of the navigation functions. In reference to FIG. 2D, an embodiment of a Dynamic Navigation Widget displayed on the display screen of the mobile device is illustrated. Walky talky application link is displayed on the screen and additional spaces for other pre-bundled third party applications are displayed as well. Dynamic navigation widget may be displayed in a screen of about 200 by 300 pixels and may provide access to the group and navigation applications. Similarly, application grid may also provide access to the group and navigation applications.

Figure 2E:
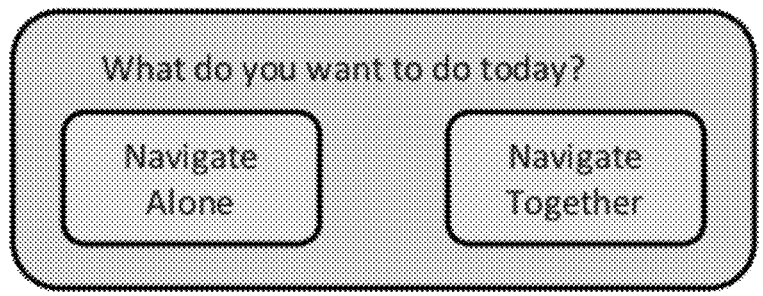
FIG. 2E are illustrations of other embodiments of displayed mobile device applications.
Figure 2E:
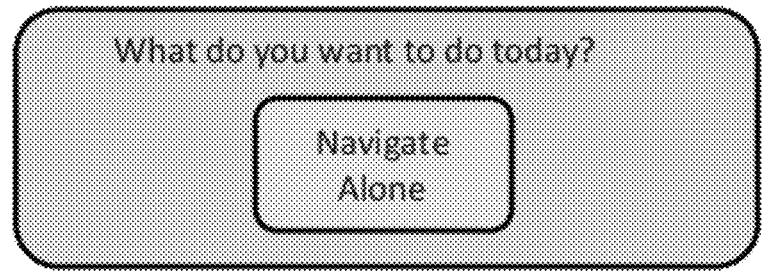

Referring now to FIG. 2E, two embodiments of welcome appearances are illustrated. A connected mode welcome appearance may be used for a user who is a member of a group of mobile device users. The user may be prompted to either navigate alone or navigate together with the group. Connected mode may involve inserting the SIM card into mobile device and having valid GPRS settings. In another embodiment, a user who is not a member of a group may be prompted to navigate alone. PND mode, or the individual mode of navigation, may involve no SIM card inserted and may be used when the user selects flight mode or PND mode from the profile.

Figure 2F:
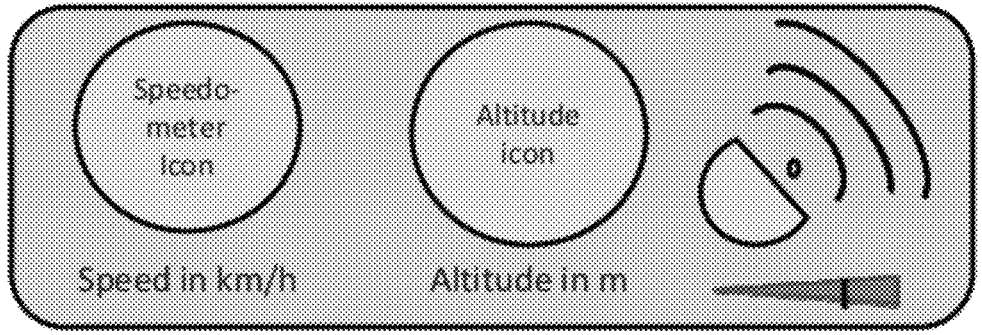
FIG. 2F are illustrations of other embodiments of displayed mobile device applications.
Figure 2F:
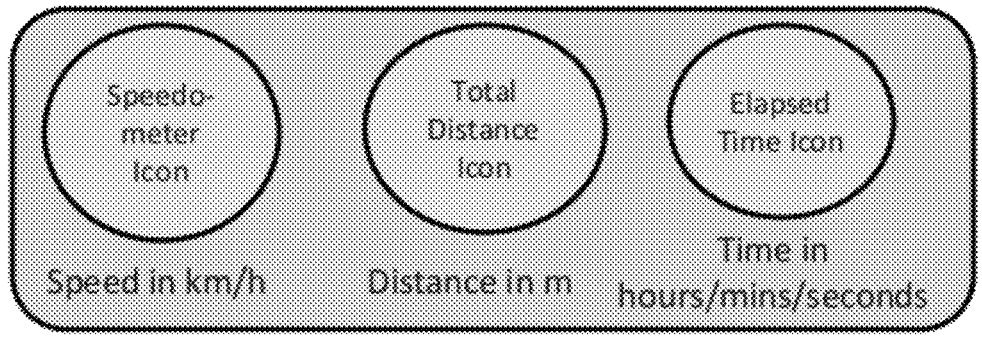
Figure 2F:
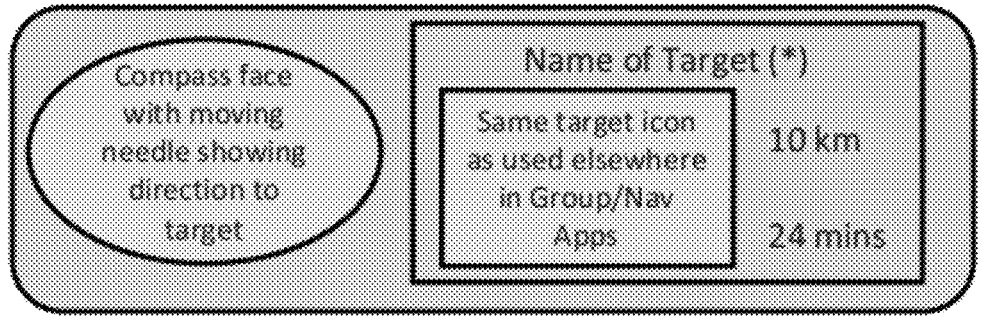

Referring now to FIG. 2F, three embodiments of navigation appearance as displayed on the display screen of the mobile device are illustrated. In the map mode, the screen may display speedometer icon along with speed in km/s, an altitude icon along with altitude in meters and the GPS signal icon along with GPS error percentage or other indicator of GPS accuracy. In the tracking mode, the screen may display the speedometer icon and the speed in km/s along with the total distance along with distance in meters and the elapsed time along with time in hours, minutes and seconds. In the navigation mode, the screen may display the compass face with moving needle showing direction to the target along with the name of the target and the distance from the target as well as the time to the target. The screen may also display the target icon as used elsewhere in the group and navigation applications.

Figure 2G:
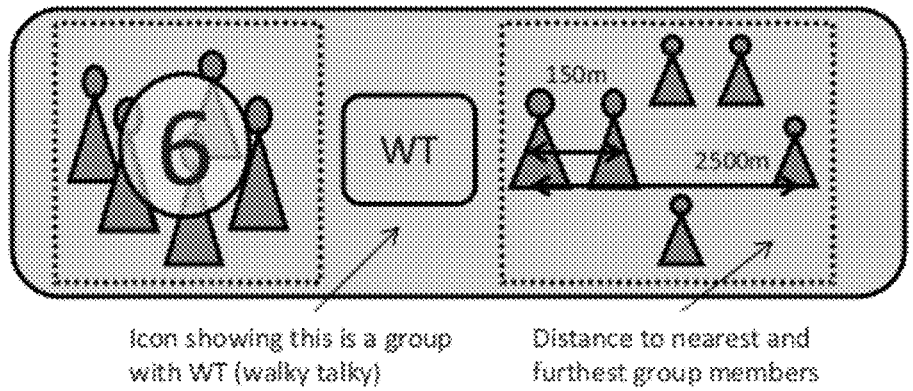
FIG. 2G is an embodiment of displayed mobile device applications.
Figure 2H:
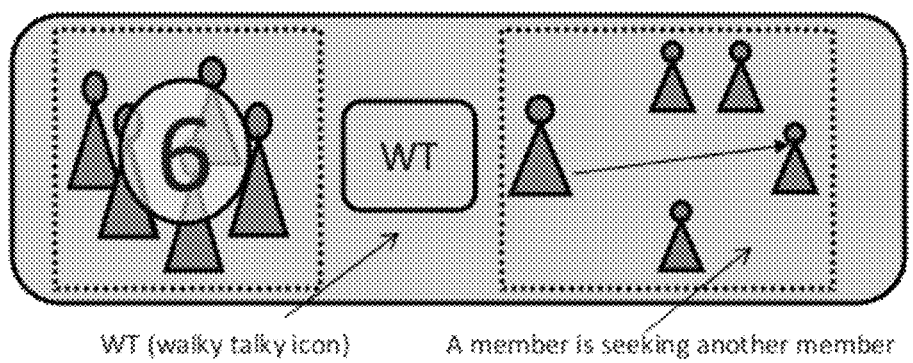
FIG. 2H is an embodiment of displayed mobile device applications.
Figure 2I:
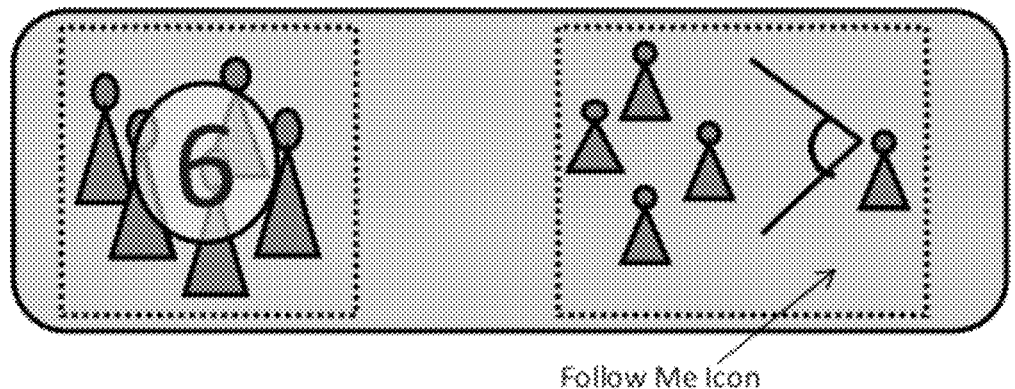
FIG. 2I is an embodiment of displayed mobile device applications.
Figure 2J:
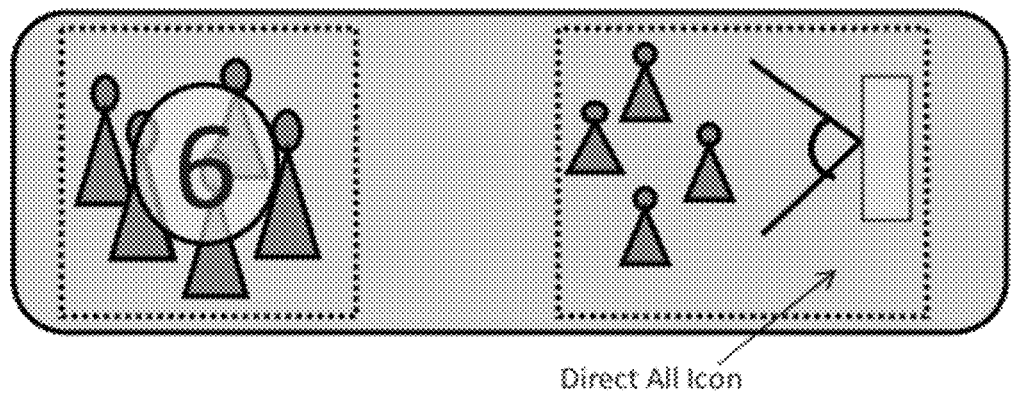
FIG. 2J is an embodiment of displayed mobile device applications.

Referring now to FIGS. 2G-J, embodiments of dynamic navigation widget navigation appearance are illustrated. In FIG. 2G, an embodiment of a dynamic navigation widget of a group mode display having no navigation operations is illustrated. In FIG. 2H, an embodiment of a dynamic navigation widget of a group mode display in which a "seek member" operation is in operation is illustrated. In FIG. 2I, an embodiment of a dynamic navigation widget of a group mode display having "follow me" operation is illustrated. In FIG. 2J, an embodiment of a dynamic navigation widget of a group mode display having "direct all" operation is illustrated.

Figure 2K:
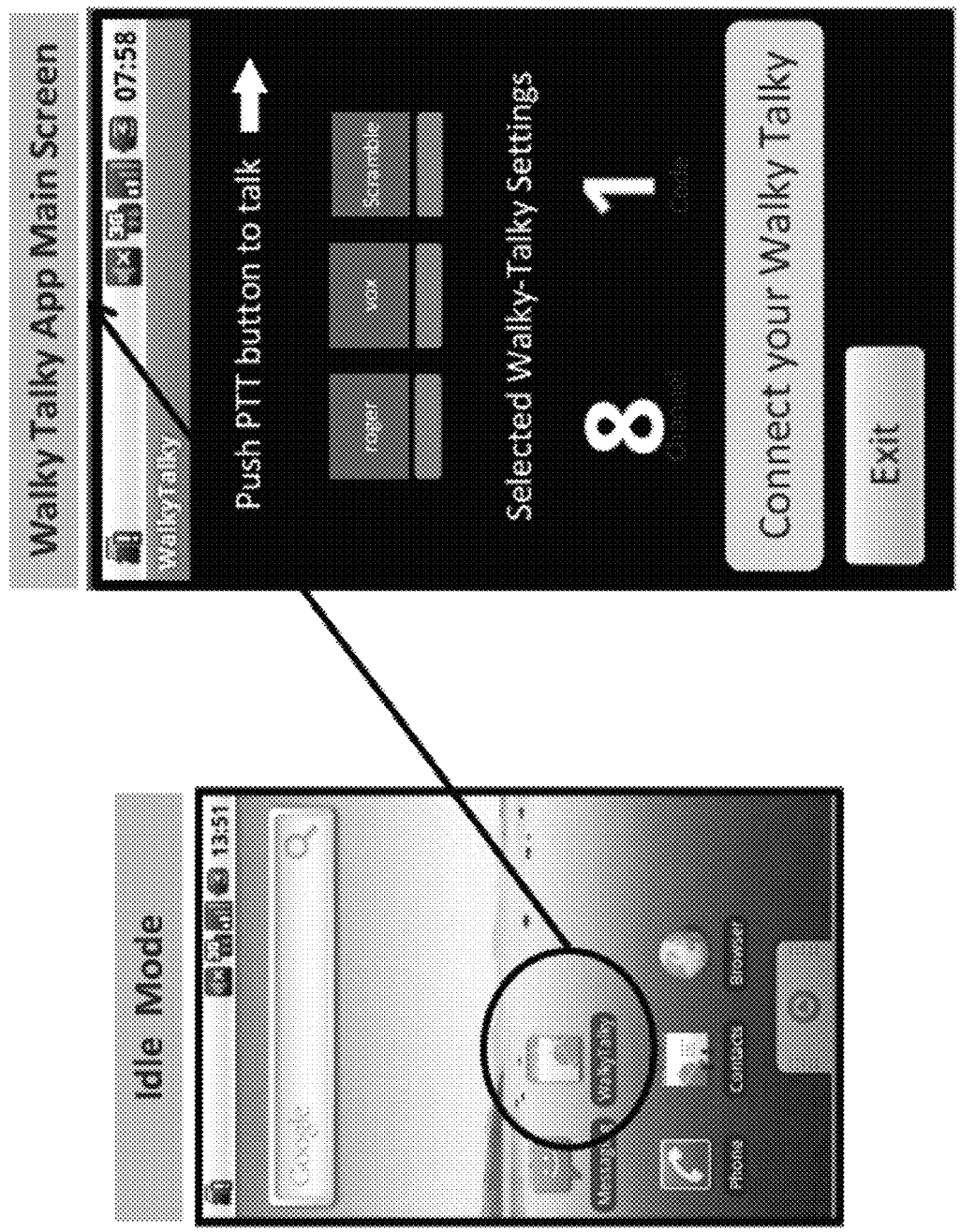
FIG. 2K are illustration of embodiments of displayed mobile device applications.

Referring now to FIG. 2K, an embodiment of a mobile device display and selection of a walky talky application is illustrated. Display screen may display any number of applications, such as the messaging application, walky talky application, phone application, contacts application, a browser application or any other application described herein. Once the user selects a walky talky application, a new screen will be displayed. The walky talky screen may provide various walky talky commands, such as "roger", "vox" and "scramble" along with a button to push for communication. Walky talky application may also provide the channel and code for communication. The channel may determine the channel via which a call will be made and the code may be an encryption code. The user may select "connect your walky talky" and upon completion of the conversation the user may select "exit" button.

Figure 2L:
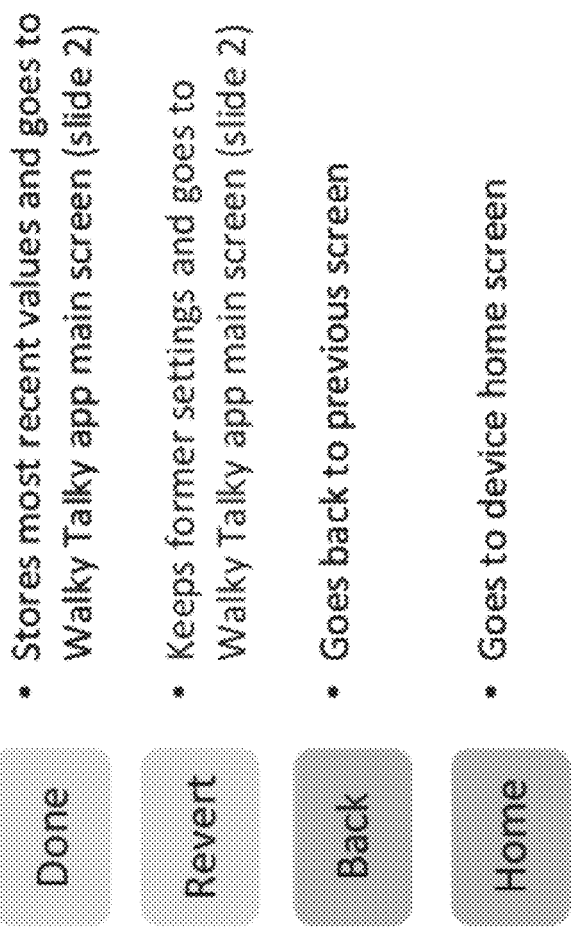
FIG. 2L is another illustration of an embodiment of displayed mobile device applications.
Figure 2L:
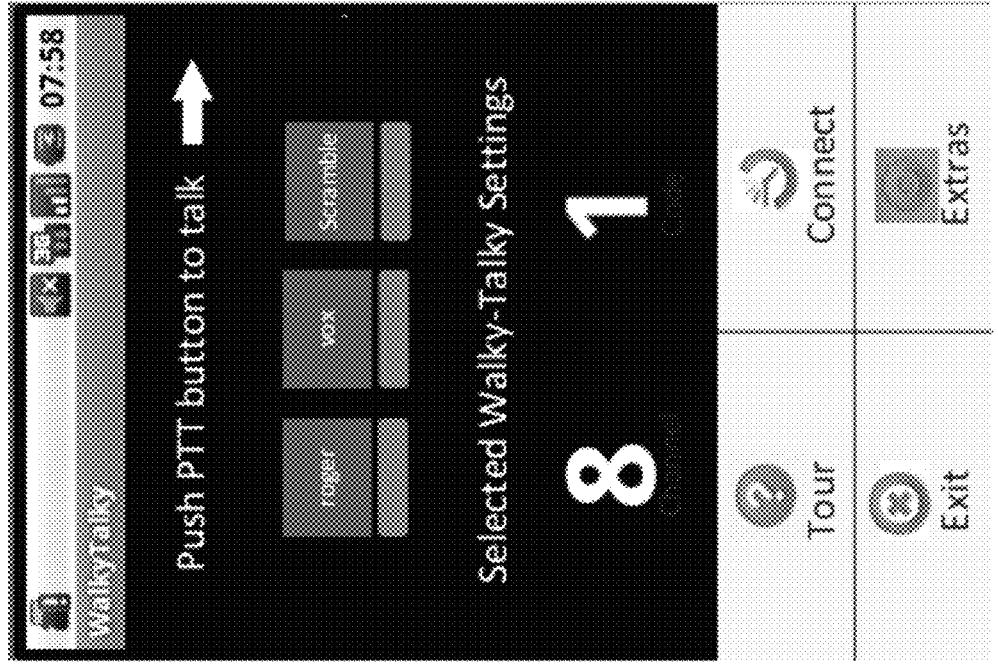

Referring now to FIG. 2L, another embodiment of a walky talky display screen is illustrated. In addition to previously discussed buttons and options, the user may also select "tour", "connect", "extras" and "exit" button. The function keys provided may include "done", "revert", "back" and "home". Done key may lead to the stored values and go to walky talky application main screen. Revert key may lead to former settings kept and also go to walky talky application main screen. Back button may lead to a previous screen, while the home button may lead to the home screen.

C. Creating a Group and Providing Group Related Functions Via Mobile Devices

When a group of outdoor enthusiasts wishes to explore a particular outdoor area while sharing information and staying in close contact with each other, mobile devices 100 may be used to form a group and provide access to various operations and applications useful to these users. The group may be formed using a grouping function of the mobile devices 100 used by the users. As mobile devices 100 may use PMR radio for their communication, the services may be provided to the users over designated private radio frequencies, such as the frequencies used by walky talkies or PMR radios. As mobile devices enable users to exchange communication via PMR radio modules the users may remain in a close contact even if they are outside of a mobile telephone coverage. The users may also share any relevant information about each other or the expedition to enhance and record their expedition experience.

The group may be formed when each of the users take a mobile device and use a group administration function provided by either their own or another mobile device or a server. Each user wishing to be part of the group may bring a mobile device to a close proximity to other mobile devices of other potential group members. When all the potential group members have gathered next to each other, such as to form a circle for example, they may simultaneously press and hold a specific button on their mobile device for a predetermined period of time. The signal triggered by the pressed button may initiate a grouping function or a procedure for establishing the group.

Once the buttons on the mobile devices 100 are pressed, each mobile device may emit on a predefined channel a predefined broadcast message indicating the willingness to form a new group or join an existing one. The signal may include a pre-defined modulated code indicating the nature of the transmission. Since this action is carried out by all the participating members at once, only one sender may be initially successful in obtaining the carrier on the predefined channel. All the other users may observe, but not store or process, a carrier signal with preconfigured minimum signal strength. The carrier signal may include a known modulated code indicating its willingness to form a new group or join an existing one. The potential group members who could not send their grouping requests may continue monitoring the signal strength of the carrier on that radio channel until the signal drops below a predefined level. Then, all waiting to-be group members may try to resend their broadcast message and observe if the message has been successfully received. This process of resending the broadcast message and waiting may continue until each member has successfully sent the full sequence of its grouping broadcast message.

The message may include a randomly generated alphanumeric string unique for that mobile computing device. The additional mobile computing device, such as a server or one of the mobile devices of the users in the group, may continuously analyze received radio signals on the predefined channel looking for the pre-defined modulated code. Once such a code is identified, the additional mobile computing device, or the server, may store the alphanumeric string that follows the code. The additional mobile computing device may also store any additional information that may be included therein, provided that the observed carrier signal strength is greater than a predefined level. The process of listening and storing may continue until such minimum set period of time during which no additional messages of this kind are received by the additional mobile computing devices. In some embodiments, the messages may be exchanged between each of the mobile devices of the group, such that each mobile device has exchanged a transmission with each of the other mobile devices in the group.

After each successful transmission, the member of the group may send new broadcast messages on a predefined radio channel offering a public encryption key and asking for group member information. These messages may be ignored by all potential group members. The additional mobile computing device, or the server, may listen for and answer these requests. In some embodiments, each of the mobile devices may listen for and answer the requests. The server, which may be a server or a mobile device of the group, may send the response that is encrypted with the public key of the requestor. In some embodiments, each of the mobile devices send the response that is encrypted with public key to each of the requestors. The response may include all observed alphanumeric codes of the potential members including (but not limited to) any other provided information such as human readable name and/or avatar. As such, only the original author of the request may be able to decrypt and read the response from the additional mobile computing device. Should it be necessary, this process of establishing the encryption key may continue until each member has fetched the desired information from the additional mobile computing device. Each potential group member may now be aware of the total number of group members including certain information about these group members which may be used for (but not limited to) exchanging information and messages via the additional mobile computing device. In some embodiments, as each of the mobile devices has exchanged encryption key with each and every mobile device of the group, all of the mobile devices of the group may know the encryption keys for each of the other mobile devices.

After a group is established, the members may use any of the group operations or applications. The group members may transmit information to intermediary devices, such as a main mobile device or a server and the main mobile device or the server may process the information and transmit the output of the processed information to other mobile devices. For example, the information received from a mobile device may include location information, GPS data coordinates, altitude information, weather information, navigation or location bearing information with respect to a specific site, information about speed, remaining battery capacity, area or path pointers of the general region, information about weather, updates regarding the trip, pointers and locations of specific paths or shortcuts, comments, pictures, audio files or videos as well as any other data which may be generated by the members of the group. The information may also include information about the location of particular shortcuts, paths, alleys, meadows, trees, rocks, mountain paths, cliffs, skiing trails, streams, ponds, sources of water, plants, animals or any other information of interest.

The server or the main mobile device may process the incoming information and provide the processed data or the consolidated output of the information to other or all members of the group. The processed data distributed to other members of the group may include: consolidated historical data for producing journals about the trips made, way points or pointers for paths in a wooded area, shortcuts, interesting sites noticed by other members or users, breaks, comments, pointers or guides. Processed data may also include a map of locations or sites that are not marked on conventional maps, but rather included by one or more members of the group, a single map comprising locations of various points of interests of all the members and including the locations of any of the sites, paths, streams, ponds, animals, water sources, trees that all of the members of the group contributed, a path of a particular member or a plurality of members, speed with which a member traveled through an area as well as any graphical or video recordings of the area. The output transmitted from the main mobile device or the server to the members may include any consolidated and processed data provided by any number of the members of the group.

To share and access the information, group members may utilize group operations or applications, such as dynamic group tracking applications, tracking and publishing applications and augmented reality applications. Dynamic group tracking operations or applications may enable the group members to display a dynamically zooming and panning terrain map of the surrounding area along with locations of multiple members positioned on the map. Some group operations may provide summary of group information in real-time overlay image or widget. Group operations may include group communication functions for walky talky standard voice communication via PMR and/or GSM/GPRS networks. Communication functions may be designed to operate using PMR 446.

Group operations may also include group navigation functions or applications. For example, a follow me function may be used by a member to request the other members to follow the tracks or the path of this member. A seek member function may be used to find the location of a member. A seek member via member function may be used to find a member that is outside of the PMR range by using mobile devices 100 of other members as the extension of the requestor's range. When members are dispersed throughout an area, a function called seek member via member function may enable a member to find the location of a member that is outside of the PMR radio range using the mobile devices of other group members within the range to track the target member. In such instances, the searching member may use the PMR radio range of a second member to track a third member within the range of the second member, while the third member has the original target member within the PMR radio range. A direct all function may be used to direct all users to a specific location or a user. A dynamic lead application may assign the team member as a leader of a group whom all may follow the user whose trajectory for reaching a target destination is currently the shortest or the most convenient, and then switch to another lead when the next person is in the best location.

Dynamic chase application may enable the members to follow the group member which currently satisfies the chase criteria best. The criteria may include battery levels, combination of user's data, speed, group rating and present location. An interactive map view may enable any member to impose, offer and acquire one's viewpoint on a current common map as well as turn, pan and zoom a global map for all members.

Tracking and publishing applications may enable the member to use a variety of options or features. A point of interest feature may enable a member to publish or retrieve point of interest for current location or area. Geo-tagged Media may enable a member to produce or fetch audio, image and video objects for current position, location or area. Real-time trip publishing may enable a member to share current trip online, such as media files generated during the present expedition, video files, audio files as well as logs and comments.

Augmented reality applications may enable a member to modify a map of an area to include information and media, such as photos or videos of the specific area. In some embodiments, augmented reality applications enable the user to view the area behind a mountain, hill or a ridge. For example, the users may access a view as they would see should they cross the mountain. Ghost option may enable the users to place a picture or an avatar of the person who has traveled the same path previously and whose trip record the member is using for reference. Auto recall may enable the member to overlay the last trip data of the member on the map during the present trip of the same area. Hybrid may enable the user to overlay certain map elements on to live images. History may enable the member to insert or remove items of landscape according to historic data and period chosen. In some embodiments, this feature may enable the system to include archeological data, such as skeletal remains or to include historical data. In some embodiments, augmented reality applications may enable the member to use real-time geological data. In further embodiments, a tracker function may be used to act as a live tracking device for dogs, pets and other moving objects. A group trip recorder may be used to record all relevant data of the group, including the conversation and media files onto a storage device.

Figure 3A:
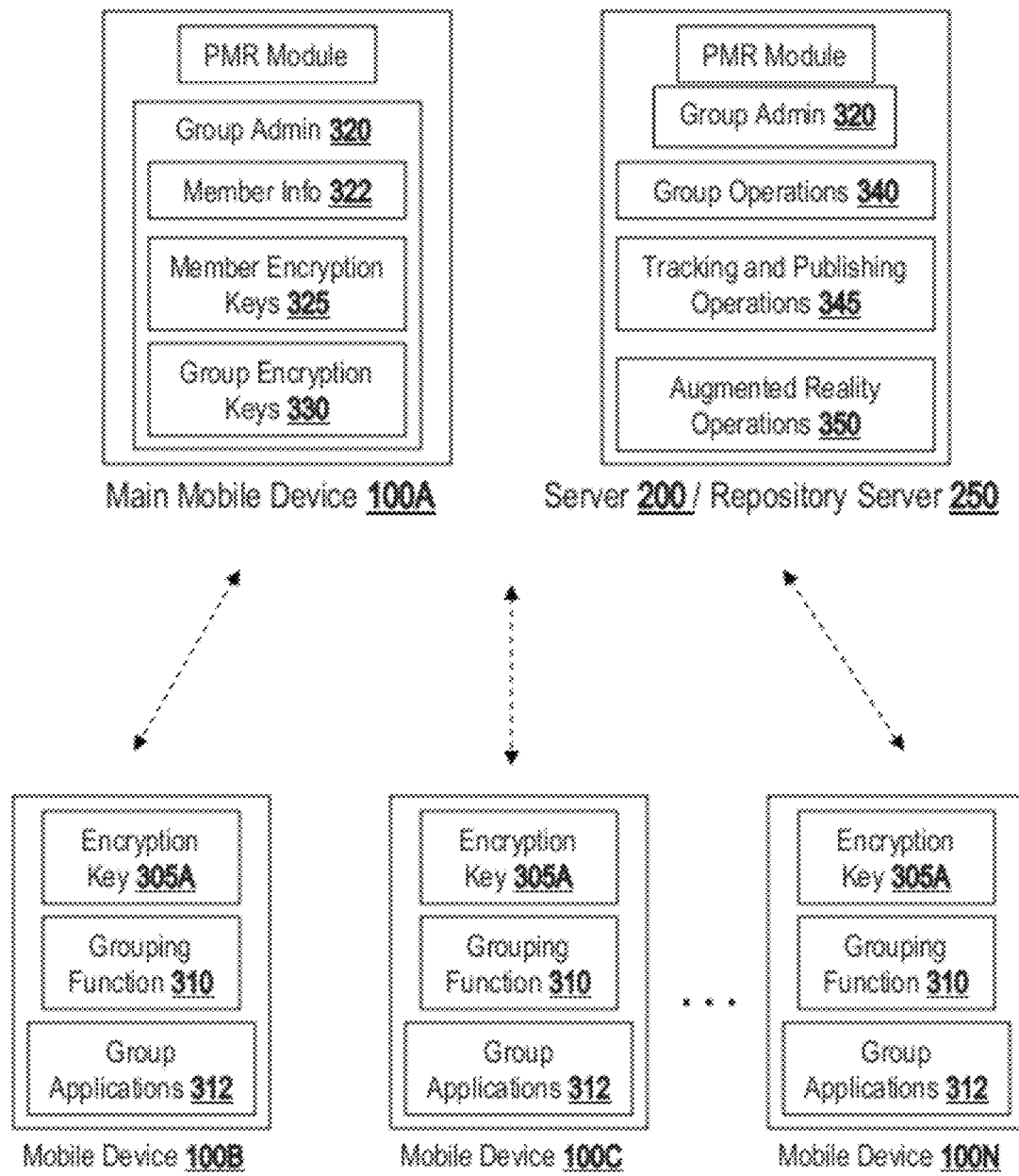
FIG. 3A is a block diagram of a system for creating a group and providing group services and applications to mobile device users.

Referring now to FIG. 3A, an embodiment of a system for establishing a group and providing group related operations, applications and services to a plurality of mobile devices 100 is illustrated. In brief overview, the system may comprise a main mobile device 100A and a server 200 or a repository server 250. A group of mobile devices 100, such as devices 100A, 100B, 100C through 100N may each be a member of the group. In addition to the aforementioned features of a mobile device 100 such as the PMR module, main mobile device 100 may also include a group admin 320 which may further include member information 322, member encryption keys 325 and group encryption keys 330. Server 200 or the server 250 may include a PMR module along with group admin 320, group operations 340, tracking and publishing operations 345 and augmented reality operation 350. Mobile devices 100, such as mobile devices 100B and 100C through 100N, may each comprise an encryption key 305, grouping function 310 and group applications 312.

Main mobile device 100, such as main mobile device 100A, may be any mobile device 100 further comprising an active group administration function 320. The group administration function 320 may also be referred to as group admin 320. Main mobile device 100 may comprise any functionality of a mobile device 100. Main mobile device 100 may be mobile device selected to be the main mobile device 100 by a leader of a group, such as a guide or a group leader. Main mobile device 100 may be selected based on the user in charge of this device or based on the functionality of the device, such as the battery charge available, memory available, stored applications or mobile device configuration that may make this mobile device more suitable for this task. Main mobile device 100 may communicate with other mobile devices using the aforementioned PMR module.

Member information 322, also referred to as member info 322, may comprise any information about a member of the group. In some embodiments, member info 322 includes information about a particular user of a particular mobile device 100. Member info 322 may include a user's name or an identifier of a mobile device 100 the user is utilizing. Member info 322 may include information about the access of the member, such as for example information identifying which information the member may view and which information the member should not be able to access. Member info 322 may include any information or data the particular member generated, stored or sent via main mobile device 100A, server 200 or server 250.

Member encryption keys 325 may comprise any one or more encryption and decryption information, such as the encryption/decryption keys for communicating with any particular mobile device 100. Member encryption keys 325 may comprise a string of characters and number, such as an alphanumeric string, a selection of any random data including binary data string, a word or any input based on which communication may be encrypted or decrypted. Member encryption keys 325 may include encryption or decryption information that is mobile device 100 specific. For example, in a group of mobile devices 100, each member encryption keys 325 may comprise information that is different from the member encryption keys 325 information of other mobile devices 100 of the group. Member encryption keys 325 may comprise information about a single user or information about each of the users individually. In some embodiments, member encryption keys 325 comprises a selection of encryption/decryption data or keys for each individual member of the group along with the identifier of the mobile device of that member. The device storing the member encryption keys 325 may access the information from member encrypt keys 325 in order to encrypt or decrypt transmission for any particular mobile device 100.

Group encryption keys 330 may comprise any group related encryption or decryption information. Group encryption keys 330 may include any group related encryption or decryption data for communicating with all the group members simultaneously. Group encryption keys 330 may comprise a string of characters and number, such as an alphanumeric string, a selection of any random data including binary data string, a word or any input based on which communication may be encrypted or decrypted. Group encryption keys 330 may include encryption or decryption information that is group specific and may be deciphered by any member of the group, but not by other devices outside of the group.

Server 200 may comprise any functionality of a server capable of processing data and servicing mobile devices 100 of the group. Server 200 may execute on any mobile device 100 or any computing unit that may be attached to the mobile device. Server 200 may comprise hardware, software or a combination of hardware and software for processing and storing data as well as attaching itself to a mobile device. Server 200 may comprise any logic, functions, executables, units or components for receiving data, and transmitting data. Server 200 may comprise a processor 101 and a PMR module, such as the processor 101 and the PMR module or walky talky module described earlier. Server 200 may also comprise any other functionality of a mobile device 100, such as a battery for storing charge or energy and means for recharging the battery. Server 200 may comprise functionality for receiving and transmitting data and information via PMR module. In some embodiments, server 200 may comprise a GSM module, GPS module, memory modules or any other hardware or software component of the mobile device 100. Server 200 may also include the functionality for communicating with a mobile device 100 and the functionality for receiving a signal from a mobile device and transmitting a signal to the same or a different mobile device 100. Server 200 may include the functionality for communicating with a remote server, such as a repository server 250. Server 200 may also include memory for storing data or information. Server 200 may comprise the functionality for encrypting or decrypting transmissions. In some embodiments, server 200 is a mobile computing unit that is attached to a holster or a belt worn by a user carrying a mobile device 100. The server 200 may comprise an interface for attaching itself to a mobile device 100. The server may be activated as the server when a mobile device 100 is detached from the interface of the server, such as for example when a user picks up the mobile device from the server 200 on the holster holding or latching to the mobile device 100.

Server 200 may comprise any functionality for receiving a transmission from a first mobile device 100A, processing the transmission to produce an output and transmitting the output of that transmission to a second mobile device 100B. In some embodiments, server 200 receives an encrypted message from a first mobile device 100A and decrypts the message using the encryption/decryption key for the mobile device 100A. Server 200 may comprise the functionality to render the contents of the message, such as a parser. Server 200 may identify that the message comprises location information for a second mobile device 100B. Upon processing the data from the message, Server 200 may comprise the functionality to generate a new message using the output from the processed message from mobile device 100A and transmit the new message to the mobile device 100B using an encryption/decryption key particular to the mobile device 100B. Server 200 may be in communication with any mobile device 100 via PMR radio, WLAN, WiMAX or any other means of communication.

Repository server 250 may include any hardware, software or a combination of hardware and software for receiving, processing, storing and transmitting data or information. Repository server 250 may comprise any functionality of a server 200. In addition, repository server 250 may comprise functionality for serving or providing applications requested by the members. Repository server 250 may be a server accessed via an IP connection or a TCP/IP connection. Repository server may comprise any data that may be stored or received by the server 200. Repository server 250 may be any server, such as a service provider server, a mobile telephone network provider server, a proxy server, a file server, an application server, a cache server or a web server. Repository server 250 may be in communication with any mobile device 100 via PMR radio, WLAN, WiMAX or any other means of communication.

Group operations 340, tracking and publishing operations 345 and augmented reality operations 350 may include any type and form of operations, applications or functions that may be utilized by the group members via their mobile devices 100. Operations 340, 345 and 350 may include functions, scripts, algorithms, graphical user interfaces, programs, libraries or scripts. These operations may include functionality to provide members of the group with navigation functions or applications for finding other members of the group, to augment or edit the maps or features displayed on mobile devices 100 or to track and publish data or information in a manner most useful to the members of the group. Operations 340, 345 and 350 may include functionality to gather the received member information or data and use this information and data as input to produce output to be presented to the group members or a specific member intended.

Group operations 340 may comprise a follow me application that may enable a member to request from other members to follow his or her tracks or path. Group operations 340 may include a seek member function that may enable a member to find the location of another member. Group operations 340 may include a seek member via member application that may be used to find a member that is outside of the PMR radio range used by the seeking member. The seeking member may use mobile devices 100 of other members that are closer to the target member to extend their reach and find the target member. A direct all function may be used to direct all users to a specific location or a user. Group operations 340 may comprise a dynamic lead application that may a team member as a leader of a group whom all may follow. The leader may be the user whose trajectory for reaching a target destination is currently the shortest or the most convenient. This application may include functionality to switch to another leader when the next person is in the best location. Group operations 340 may include a dynamic chase application that may enable the group members to follow a member that currently satisfies the chase criteria the most. The criteria may include battery levels, combination of user's data, speed, group rating and present location. Group operations 340 may comprise the functionality to generate and display an interactive map view may enable any member to impose, offer and acquire one's viewpoint on a current common map as well as turn, pan and zoom a global map for all members.

Tracking and publishing operations 345 may include any applications, functions or operations to enable a member of the group to use a variety of options or features to provide the user with more information about the specific area the user is visiting. Tracking and publishing operations 345 may comprise any number of features, functions or applications. Tracking and publishing operations 345 may comprise functionality to enable a member to publish or retrieve point of interest for the current location or area. Additional functionality may include a feature for enabling a member to produce or fetch audio, image and video objects of the present location or area. Tracking and publishing operations 345 may also include the functionality for enabling a member to share current trip experiences online, such as media files generated during the present expedition, video files, audio files as well as logs and comments. Tracking and publishing operations 345 may include the functionality for enabling a user to track children, people, or even pets, such as dogs or any other moving objects. Tracking and publishing operations 345 may include functionality to record all relevant data of the group, including the conversation and media files onto a storage device.

Augmented reality operations 350 may include applications, functions or operations to enable a member to modify a map of an area to include information and media, such as photos or videos of the specific area. Augmented reality operations 350 may include functionality to enable the user to view an area behind a mountain, hill or a ridge. Augmented reality operations 350 may include functionality to place a picture or an avatar of the person who has traveled the same path previously and whose trip record the member is using for reference. Augmented reality operations 350 may include functionality to enable the member to overlay the last trip data of the member on the map during the present trip of the same area. Augmented reality operations 350 may include functionality to enable the user to overlay certain map elements on to live images or enable a member to insert or remove items of landscape according to historic data and a chosen period or archeological data, such as skeletal remains.

Encryption key 305 of a mobile device 100 may be any encryption/decryption information used by the mobile device 100 for communication. Encryption key may comprise a string of characters and/or numbers, such as an alphanumeric string, a selection of any random data including binary data string, a word or any input based on which communication may be encrypted or decrypted. Member encryption keys 325 may include encryption or decryption information that is mobile device 100 specific. Encryption key 305 may include any information of member encryption keys 325. Encryption key 305 may be a member specific encryption key for encrypting or decrypting communications transmitted via radio frequencies.

Group function 310 may include any function for joining an existing group or forming a new group. Group function may comprise any hardware, software or a combination of hardware and software. Group function 310 may include functions, programs, applications, scripts and algorithms. Group function 310 may be triggered by a button on a mobile device 100 pressed by a user. Group function 310 may send a signal indicating to a main mobile device 100 that the mobile device 100 emitting the signal requests to join a group or form a group. Group function 310 may comprise functionality to listen for any reply to the request from the main mobile device 100. In further embodiments, group function 310 includes functionality for resending the request should the response not be received. Group function 310 may communicate with group administration application 320 on the main mobile device 100 to enroll the mobile device 100 into a group or to start a new group with another one or more mobile devices 100.

Group applications 312 may comprise any type and form of applications executing on the mobile device 100. Group applications 312 may comprise applications provided by group operations 340. Group applications 312 may comprise applications, functions or features provided by tracking and publishing operations 345. Group applications 312 may comprise applications, functions and features provided by augmented reality operations 350. Group applications 312 may enable the user to communicate with main mobile device 100 or server 200 or server 250 as necessary to be able to utilize any information, service or function provided or served by any one of the operations 340, 345 and 350.

Figure 3B:
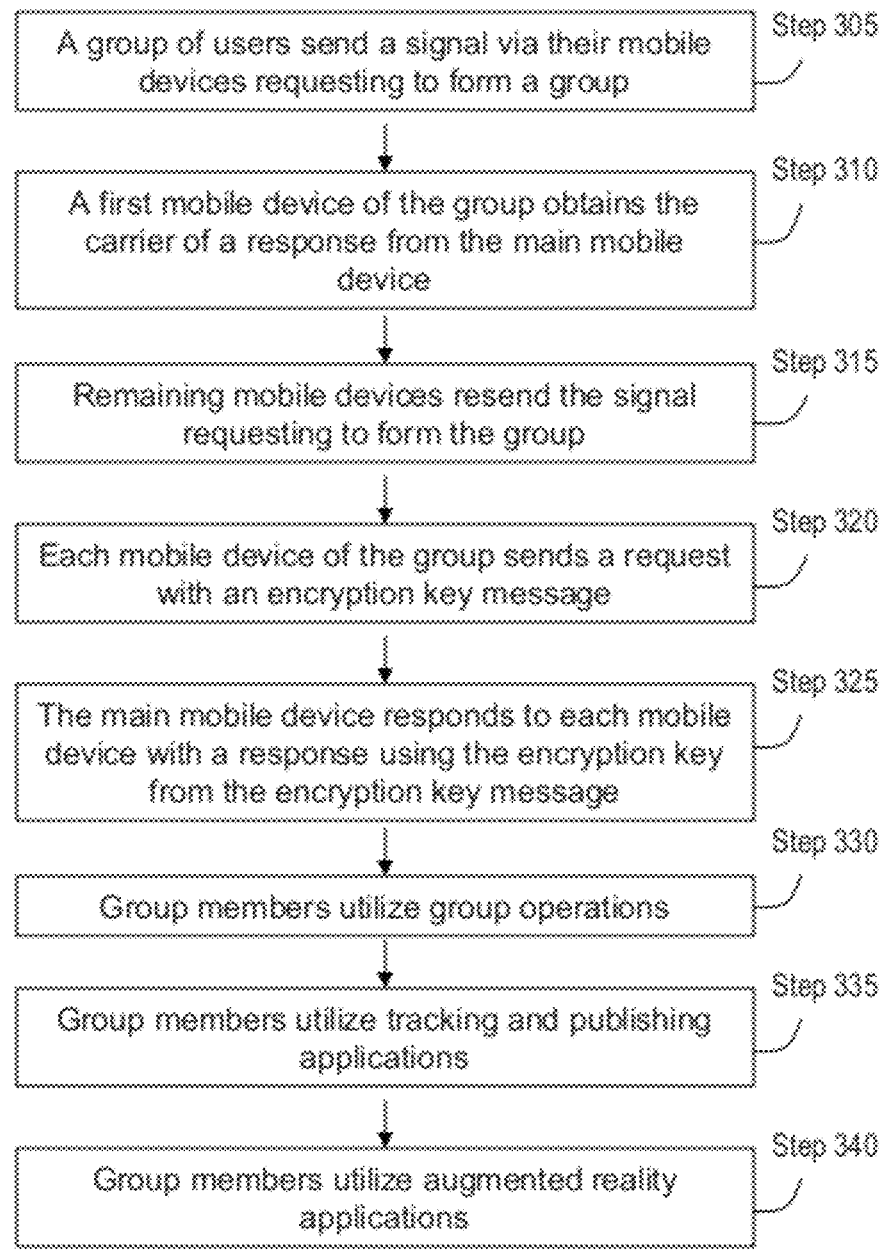
FIG. 3B is a flow diagram of embodiments of a method for creating a group and providing group services and applications to mobile device users.

Referring now to FIG. 3B, an embodiment of steps of a method for forming a group and using the services of the group provided functions is illustrated. In brief overview, at step 355 a group of users send a signal via their mobile devices requesting to form a group. At step 360, a first mobile device of the group obtains the carrier of a response from the main mobile device. At step 365, remaining mobile devices resend the signal requesting to form the group. At step 370, each mobile device of the group sends a request with an encryption key message. At step 375, the main mobile device responds to each mobile device with a response using the encryption key from the encryption key message and the group is established. At step 380, group members access and utilize the group operations. At step 385, group members access and utilize the tracking and publishing applications. At step 390, group members access and utilize augmented reality applications.

At step 355, a group of users send a signal via their mobile devices requesting to join an existing group or form a new group. In one embodiment, each mobile device broadcasts a first request to establish a group. The users may come close to each other, form a circle and simultaneously press a button to send a signal from their mobile devices. The signal may be transmitted via PMR module of the mobile devices. The broadcasted signal may be on a predetermined channel using a predetermined modulated code. For example, the signal may be a PMR radio signal via a PMR radio channel at around 446 MHz. The signal may indicate to a main mobile device or a server, such as the server 200 or server 250, that the mobile devices 100 would like to form a group or join an existing group. The signal may be a digital or an analog signal. The signal may comprise a code word or an instruction. The signal may comprise a string of characters to be used for further communication, such as an encryption key 355 or an encryption word.

In one embodiment, the mobile device broadcasts the signal in response to a user pressing a button on the mobile device. Each user may press the button on their the corresponding mobile device for a predetermined period of time to broadcast the signal. In another embodiment, the mobile device may broadcast the signal in response to one or more gestures. For example, the user may make a gesture on a touch-based user interface that corresponds to broadcasting a signal.

At step 360, a first mobile device of the group may obtain the carrier of a response from the main mobile device. In some embodiments, the first mobile device may obtain a positive or a valid response from the main mobile device. Other devices may not receive the positive response and they have to resend the request.

In one embodiment the first mobile device of the group may be listening for the predetermined modulated code on the predetermined channel when it receives the first request from a second mobile device. In one embodiment, the first request includes a unique identifier of the second mobile device. The unique identifier may be anything that can identify the second mobile device, including, e.g., a nickname, a GSM number, device data, a serial number, a MAC address, a public SIP URI, and/or a private SIP URI.

In one embodiment, the first mobile device transmits to the second mobile device a first response. The first response may be responsive to the first request and the response may include an answer to the first request. For example, the first response may indicate that the first request was received by a mobile device. The first response may further indicate that the first mobile device is ready to continue to the next step. In one embodiment, the first response may include a unique identifier of the first mobile device.

In another embodiment, the first response may include one of an acknowledgement to form the group or a request for the second mobile device's encryption key. The acknowledgement may indicate that the mobile device is capable of joining a group. The acknowledgement may indicate that the user of the mobile device wants to join the group.

In one embodiment, the first response may be non-responsive to the first request, in which case the mobile device that sent the first request may continue to broadcast requests, stop broadcasting, or alter the broadcast signal to improve the likelihood of receiving a first response that is responsive to the first request. For example, the mobile device may alter the predetermined code, predetermined channel, predetermined modulation code, and/or unique identifier.

In another embodiment, a third mobile device of the plurality of mobile devices determines that a signal strength on the predetermined channel has dropped below a predetermined level. The third mobile device may then rebroadcast the first request to form the group. This rebroadcast may be received with a higher signal strength by the first or second mobile devices. The third mobile device may then exchange requests and responses with the first mobile device and/or the second mobile device to have the third mobile device join the group.

In another embodiment, the third mobile device may act as a bridge between the first mobile device and the second mobile device. For example, the third mobile device may be in proximity to the first mobile device and the second mobile device, whereas the first mobile device and the second mobile may not be in proximity to each other. In one embodiment, the third mobile device rebroadcasts the first request to form the group. In another embodiment, the third mobile device can exchange requests and responses between the first mobile device and the second mobile device.

At step 365, the remaining devices that had not received the response from the main mobile device within a particular time period may resend their requests. The devices may resend their requests until their requests are answered. The requests may be resent using different channels of the PMR radio or different encryptions. In some embodiments, each of the mobile devices of the group may exchange a transmission or implement a handshake with each of the other mobile devices of the group. For example, a first mobile device may send transmissions to and receive transmissions from all of the mobile devices of the group individually. The first mobile device may then establish a communication with each of the mobile devices following the communication exchange.

At step 370, each mobile device of the group may send a request with an encryption key message. The mobile devices may send the request following the receipt of the response to the prior request. A mobile device 100 may send the request with its own encryption key to the main mobile device. The mobile device may send a request which includes the encryption key 355 of the mobile device 100. In some embodiments, each of the mobile devices of the group may exchange encryption key message with all of the other mobile devices of the group. In one embodiment, the first mobile device receives a second request that includes an encryption key from the second mobile device.

At step 375, the main mobile device responds to each mobile device with a response using the encryption key from the encryption key message. The main mobile device 100 may respond to the request of the mobile device 100 at step 370 with the response that is encrypted in the mobile device encryption key 355. Even though the response is transmitted via the PMR radio, due to the encryption key, only the intended mobile device 100 may be able to decipher the message. Following this step, the group may be formed or established.

In one embodiment, the first mobile device transmits an encrypted second response that was encrypted using the encryption key of the second request. The encrypted second response may include one or more unique identifiers of mobile devices observed by the first mobile device as requesting to form a group.

In one embodiment, the first mobile device decrypts the second response from the second mobile device using the encryption key. If the decryption is unsuccessful, the mobile device may redo one or more steps in order to achieve a successful decryption. For example, the first mobile device may indicate, in a response, that the decryption was unsuccessful. The first mobile device may further request a second encryption key from the second mobile device.

At step 380, group members utilize group operations. In one embodiment, the first mobile device and the second mobile device establish the group responsive to receipt of the second response by the second mobile device. In some embodiments, the users regularly send information to the server 200 or the server 250 or to the main mobile device 100A. The received information is consolidated and processed and used to produce maps that are distributed to the members. In one example, the members send their location information and the main mobile device 100A or the server 200 or the server 250 transmits to each member of the group a map comprising locations of each of the members. In other embodiments, group members may utilize their applications to use any of the features or functions provided by group operations 390.

At step 385, group members utilize tracking and publishing applications. In some embodiments, a mobile device 100 requests and accesses an audio file, an image or a video file that was created or filmed on the location which the member is visiting. In other embodiments, the member publishes or shares trip experiences online by sending or uploading media files generated during the present expedition. The member may also transmit and store on remote servers audio files, video files, logs or comments. A group member may use the mobile device 100 to use any tracking and publishing operation 345 described herein.

At step 390, group members may utilize augmented reality applications. In some embodiments, a group member may modify a map of an area to include information, such as media relevant to the area being visited. The group member may also edit the map to include a photograph, a video or a comment about a particular site. A group member may use augmented reality applications to view an area behind a mountain, hill or a ridge. The member may use any augmented reality operations 350 described herein.

In one example, a group of mobile device 100 users congregate in an area along with their mobile devices. The group initiates the grouping function by pressing a button on each of the mobile devices simultaneously. Once the button has been pressed by each of the devices, each of the mobile devices may transmit, via their PMR radio modules, a handshake signal, such as a request which may be received by each of the mobile devices 100 of the group. Each of the mobile devices receiving the handshake signal may respond to the handshake signal by sending a handshake response to the handshake request via the PMR radio. Each of the devices may receive the responses to their handshake request signals from each of the devices and may therefore establish a communication with each of the devices of the group.

Once a device has received the handshake responses to the initial request, the device may transmit a second request that comprises the encryption key of the device. The second request may be responded to by each of the mobile devices with a response that is encrypted using the encryption key of the device. Each of the devices of the group may repeat this action by sending their own second requests with their own encryption keys and receiving responses to the second requests from each of the other mobile devices from the group. Once this interaction is completed, the group has been established.

In some embodiments, when users congregate to form a group, only a single mobile device may send the signal, while the remaining devices listen. As PMR is a broadcast half-duplex technology, mobile devices 100 may comprise functionality to ensure that only a single mobile device transmits at one time, while the remaining mobile devices listen. In some embodiments, a transponder chip of the mobile devices 100 selects or siphons out the strongest carrier signal from the group of carrier signals while blending out the remaining weaker signals as noise. Should one user press the grouping key sooner than the remaining users, those mobile devices which transmitted the signal later will detect that there is a strong carrier signal already transmitting via the channel. In response to this detection, the mobile devices whose users pressed the grouping key later than the user of the transmitting mobile device may cease transmitting any signals and may instead listen to the signal being transmitted. However, should two or more mobile devices press their keys simultaneously first, these devices may not detect any carrier signal and may begin transmitting. However, as the PMR system is a half-duplex system in which only one device may transmit while the rest listen, a function or an algorithm may be used to ensure that only a single device transmits at one time.

The function or the algorithm to ensure that only a single mobile device transmits the signal at a time may employ a technique that arranges an order for transmission of all of the mobile devices in the group. In one example, the ordering function may include transmissions of rapid broadcasts in randomly changing intervals of yet again random fixed transmit priority numbers. The transmit priority numbers may comprise random numbers of any number of digits, such as 2, 3, 4, 5, 6, 8, 16 and 32 digits. Moreover, the transmit priority numbers may be encrypted using predefined encryption known to all mobile devices of the group. After a period of time, all mobile devices may send their own transmit priority numbers and may receive all transmit priority numbers from all congregated mobile devices of the members to be. In one embodiment, no two devices may comprise the same transmit priority numbers. By knowing all transmit priority numbers of each of the mobile devices, each mobile device may compare its own transmit priority number against all the transmit priority numbers of other mobile devices. Each mobile device may therefore determine the order in which the devices will transmit, while the remaining devices listen and respond accordingly. In some embodiments, the order of transmission is arranged from the smallest number to the largest number. In other embodiments, the order is arranged from the largest number to the smallest.

In one example, each transmission may begin with a transmission priority number and may end with a transmission priority number. Then, the mobile device with the next number in line may begin the transmission. There may be an orderly process based on the transmit priority numbers of the group by which only one mobile device transmits, while the remaining mobile devices listen. In some embodiments, the whole process of grouping mobile devices is automated and triggered by the users pressing the grouping button. In some embodiments, the whole process is carried out by the mobile devices themselves and may be completed within any period of time, such as 0.1 seconds, 0.3 seconds, 0.5 seconds, 1 second, 2 seconds, 3 seconds, 4 seconds, 5 seconds, 7 seconds, 10 seconds, 15 seconds, 30 seconds or under 1 minute. In one embodiment, the mobile devices may be programmed to accept that the first mobile device that transmits the signal is the mobile device that begins the process and initiates the exchange of the transmit priority numbers. Once the transmissions are transmitted and received between the mobile devices of the group using this ordered system, all communication may be exchanged and the group may be formed.

The mobile device group may then use the functions described herein to enhance the expedition experience of the users by providing services and functions described herein via any of the mobile devices of the group which may act as the server. The mobile device acting as the server may receive data, process the data and send the data output to all the other members of the group. For example, a single mobile device may act as the server for a group of mobile devices and receive information from any number of devices. The same mobile device may process and transmit the data output, such as an integrated map comprising locations, links to photographs and videos of the sites and other inputs from any other mobile devices in the area. Similarly, at the same time, a second mobile device may also receive information from a second plurality mobile devices of the group. The second mobile device may then process the information and transmit the output of the processed information to the second plurality of mobile devices or to any one or more additional mobile devices of the group in the area. The transmissions may be implemented via PMR radio and the transmissions may be encrypted using the encryption key of each of the mobile devices individually. Using this technique, each mobile device may receive the data output from the mobile device acting as the server by decrypting the output data with the encryption key specific to the receiving mobile device.

Figure 4:
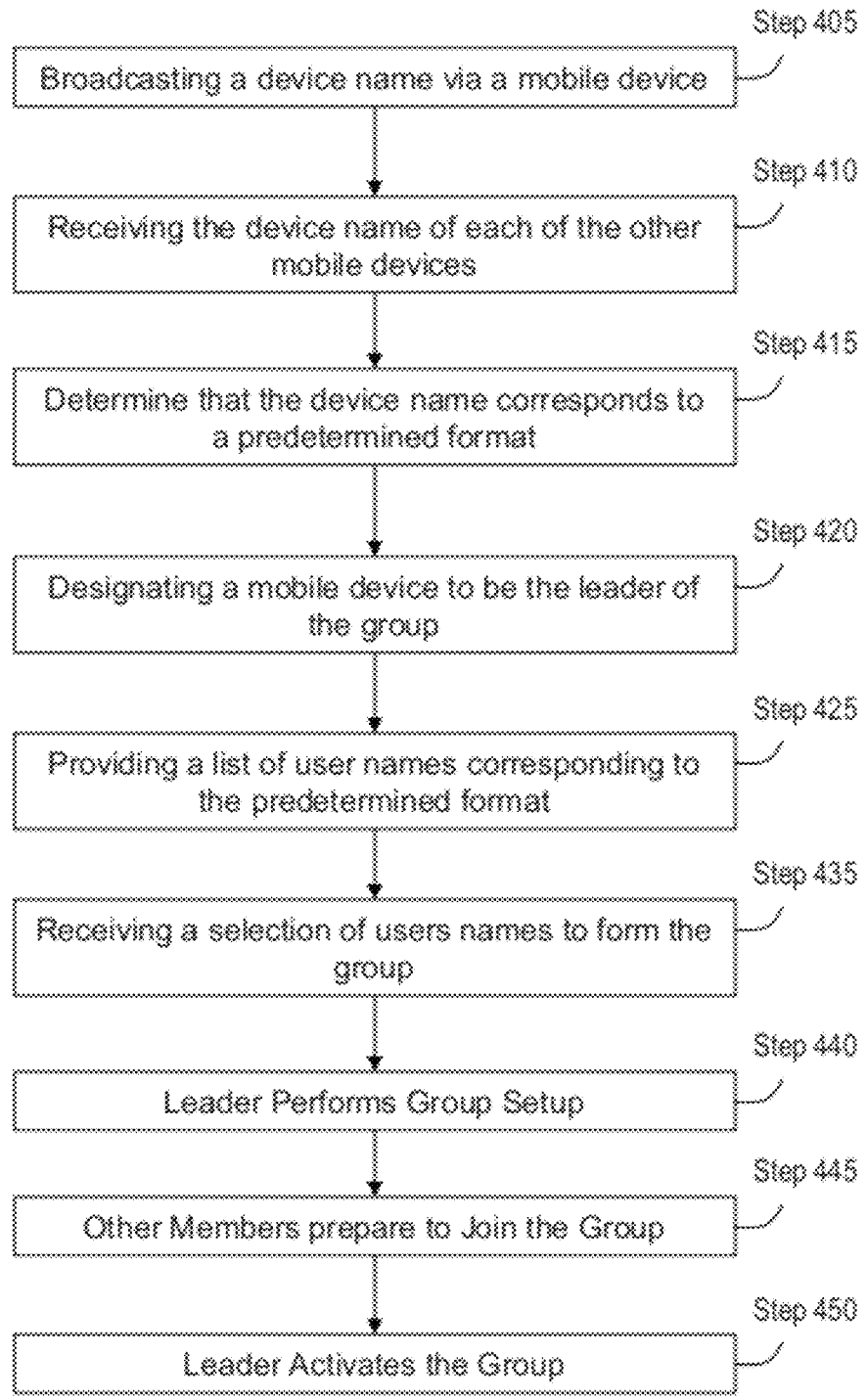
FIG. 4 is another flow diagram of embodiments of a method for creating a group and providing group services and applications to mobile device users.

Referring now to FIG. 4, an embodiment of steps of a method for forming a group of mobile devices via Bluetooth is illustrated. In one embodiment, the Group Application of each mobile device performs one or more functions related to forming the group. The Group Application may interact or communicate with the Bluetooth module and any other module in order to perform one or more functions related to forming the group in accordance with the methods disclosed herein. In another embodiment, the server performs one or more functions related to forming the group. In brief overview, at step 405 a group of users broadcast a device name via their mobile devices. At step 410, each mobile device receives the device name of each of the other mobile devices. At step 415, the Group Application determines that the device name corresponds to a predetermined format. At step 420, the Group Application designates a mobile device as the leader and designates the other mobile devices as the other members. At step 425, the Group Application provides a list of user names corresponding to the predetermined format. At step 435, the mobile device receives a selection of user names to form the group. At step 440, the leader performs group setup, including, e.g., selecting users to be a part of the group. At step 445, the other members prepare to join the group. At step 450, the leader activates the group.

In one embodiment, each mobile device involved in grouping performs one or more steps. The steps in grouping may include logging into a server. The server may be any server that can receive login authentication credentials from a mobile device and authenticate the mobile device. One step may include Bluetooth device discovery. Bluetooth device discovery may further include one or more steps. Bluetooth discovery may include storing a Bluetooth device name on the mobile device. Bluetooth device discovery may further include starting Bluetooth discovery. Bluetooth device discovery may further include filtering out mobile devices from the found Bluetooth device names based on one or more criteria. Bluetooth device discovery may further include stopping Bluetooth device discovery. Bluetooth device discovery may further include restoring the original Bluetooth device name of the mobile device.

The steps in grouping may include group members selection. In one embodiment, a designated leader performs one or more steps related to selecting members to be a part of the group. The Group Application may present the leader user with the list of nicknames extracted from the found Bluetooth device names. The leader user may select members from the list and then confirm the selections. The leader user may further send a "Group Formed" message to other members using the server. The other members, e.g., all but the leader, may wait for the Group Forming success/failure message from the leader, or they may cancel the group formation.

The steps in grouping may include Go-Live: group (presence list) creation. Group creation may include creating a group (presence list) using selected other members' public SIP URIs. Group creation may include storing a group identifier (presence list's URI) as returned from the server for usage.

The steps in grouping may include finding a good PMR channel/CTCSS code. In one embodiment, the leader user performs this step.

At step 405, a group of users broadcast a device name via their mobile devices. The Group Application of each mobile device may broadcast the device name via Bluetooth via the Bluetooth module. The device name may include data needed to identify a mobile device, including, e.g., a device class, device manufacturer, and/or serial number. The device name may include a user's nickname, a user's public session initiation protocol ("SIP") uniform resource identifier ("URI"), and/or a user's Global System for Mobile Communications ("GSM") number. The device name may be in a predetermined format. For example, the device name may include one or more predetermined data and be encoded using a uniform transformation format. The mobile device may store its own Bluetooth device name.

In some embodiments, the Bluetooth device name is a string of bytes, such as a max of 248 bytes. In some embodiments, the group application sets the device name string to:
1) Data needed to identify a mobile device (single-byte, ASCII string)
2) User's Nick-name as set during the Group App setup (2-byte Unicode string)
3) User's Public SIP URI (single-byte, ASCII string)
4) Users GSM number (single-byte, ASCII string)

In some embodiments, strings in the device name are separated by a predetermined character, such as semi-colon character (;). In some embodiments, the device name string is UTF-8 encoded before being set. In some embodiments, UTF-16 may be used. An example device name is as follows:

(TW data);John;sip:john123@takwak.com;+38598123456

In one embodiment, a group of users initiate grouping via their mobile devices. In one embodiment, the initiation process includes logging into a server. One or more mobile devices transmits a login request to the server. The login request may include a plurality of parameters, including, e.g., at least one of a server address, data for a SIP, a URI, a public SIP URI, a private SIP URI, a password, a username, and a device name. Upon receiving the login request and corresponding parameters, the server may confirm the login.

At step 410, a mobile device discovers other mobile devices via Bluetooth. The Group application may communicate with the Bluetooth module to start Bluetooth discovery of other mobile devices. In one embodiment, all potential group members initiate Bluetooth discovery at approximately the same time. The Bluetooth module on the mobile device may switch on or otherwise be activated. The Bluetooth module scans for other Bluetooth devices within proximity to the mobile device.

The Group Application of the mobile device may stop Bluetooth device discovery after discovering one or more mobile devices capable of forming a group. In one embodiment, the mobile device stops Bluetooth discovery after a period of time. In another embodiment, the mobile device stops Bluetooth discovery upon an indication from the user to stop Bluetooth discovery. In yet another embodiment, the mobile device may stop Bluetooth device discovery after discovering a predetermined number of mobile devices. In one embodiment, the mobile device's device name may be restored to its original name.

At step 415, the Group Application determines that the device name corresponds to a predetermined format. The Group Application, upon discovering one or more Bluetooth device, filters out Bluetooth mobile devices that are capable of forming a group based on the predetermined format of the device name. The mobile device may discover a plurality of Bluetooth devices, only a subset of which are capable of joining a group pursuant to the method presented herein. In one embodiment, the Group Application of the mobile device can determine, based on the device name of a predetermined format, a subset of discovered Bluetooth devices that are mobile devices that are capable of forming a group. For example, all Bluetooth devices that are capable of forming a group as disclosed herein may have device names that contain certain characters or character combinations, including, e.g., letters and number combinations.

At step 420, the Group Application of the mobile device determines a user associated with a mobile device to be the leader and one or more users associated with the other mobile devices to be the other members. In one embodiment, the Group Application designates the leader role by extracting the URIs of all mobile devices. The mobile device with the lowest URI alphabetically may be the leader and the other mobile devices may comprise the other members. In another embodiment, the Group Application determines the leader based on one or more factors. For example, the leader may be the user whose mobile device was first to send out a login request and/or a Bluetooth discovery signal. In another example, the leader may be the user whose mobile device is physically located closest to the center of all the other mobile devices. In another example, the leader may be the user whose mobile device was historically designated the leader. In yet another example, the Group Application may determine the leader based on the mobile device with the strongest signal strength or longest remaining battery life. In some embodiments, the users may vote, via the mobile device, to select a leader. The status of each user (e.g., leader or other member) may be displayed via the user interface of the mobile device.

At step 425, the Group Application and/or server provides a list of user names corresponding to the predetermined format. The list of user names corresponds with a list of mobile devices that are identified as capable of forming a group. The list may identify the mobile devices by their device name or one or more components of the device name. In one embodiment, the list may include nicknames extracted from the mobile device's device name. In another embodiment, the list may identify users based on one or more other factors, including, e.g., their proximity to the leader's mobile device, the order in which mobile devices sent a login request or Bluetooth discovery signal, and/or historical data. For example, a mobile device may be capable of forming a group if the mobile device's device name corresponds to the predetermined format, is within proximity to other mobile devices and responded to the discovery request. The user of the mobile device can access the list via the user interface of the mobile device.

At step 435, the Group Application and/or the server receives a selection of user names to form the group. In one embodiment, the leader, upon viewing the list of users associated with discovered mobile devices, selects and confirms one or more users to be members of the group. The leader may also make a plurality of other decisions and perform a plurality of other functions. The leader may remove anyone that does not belong to the group from the list.

At step 440, the leader performs group setup. The leader may decide whether the group will use certain features or not, including, e.g., a group talk feature. In one embodiment, this setting can become a permanent setting for a dynamic group. For example, if the group is disbanded and later reformed, this group talk setting may be automatically set without having to be reset by the leader.

In one embodiment, the leader may set additional settings based on previously set settings. For example, if the leader activates group talk, the mobile device may present the leader with a channel suggestion (the channel with the least power received) and a continuous tone-coded squelch system ("CTCSS") code. The leader may, based on the quality of the current input signal, select a channel or request another channel. In another embodiment, the mobile device may automatically select the channel with the least noise.

In one embodiment, the leader enables or disables additional features. For example, the leader may enable the feature of exchanging location information with others, incurring charges, and/or temporary storage of data on the server.

In one embodiment, the leader transmits data about the group to the server. In another embodiment, the leader ensures that each member is using the correct group configuration. The leader may, e.g., view the user's mobile device to ensure proper setup, or view the user's mobile device setup via the leader's own mobile device display. In one embodiment, the setup performed by the leader is completely transparent to the other members.

In one embodiment, the leader transmits a message to the other members indicating whether the group has been successfully formed. For example, the message may indicate that the group was formed, the group was not formed, or that group formation is still pending. In one embodiment, the other members wait for the leader to form the group. During this period, the leader may successfully form the group or cancel the group forming process.

At step 445, the other members prepare to join the group. In one embodiment, other members are prompted to agree to one or more terms. Other members may be prompted, e.g., to agree to exchanging their location information with other members via GPRS and incurring the cost and/or having location and presence data stored temporarily and securely on a server. In another embodiment, other members are warned that data and roaming charges may be incurred. If the other members agree to join the group, their devices may log into the server and indicate that they are ready to join the group upon receiving an indication from the leader.

In another embodiment, one or more other members may withdraw their request to form a group. In one embodiment, one or more other members may withdraw their request to form a group conditioned on one or more parameters set up by the leader. For example, a user may choose to withdraw from the group because they refuse to share the geographic location of their mobile device. In another example, a user may refuse to incur any additional charges, and, accordingly, choose not to join the group.

At step 450, the leader activates the group. In one embodiment, the leader selects, via the user interface of the leader's mobile device, the final button that creates the group and notifies the other members that the group is now active. The other members may receive a notification on their mobile devices that the group is now active.

In one embodiment, the server creates a group presence list. The group presence list includes identification information of the other members that are members of the group. In one embodiment, the group presence list includes the other members' public SIP URIs. In one embodiment, the group can be identified and the identification of the group can be stored. For example, the server can provide a URI for the presence list and store it on the server or send it to the mobile devices. The mobile devices may store the presence list's URI for later usage.

In one embodiment, the systems and methods disclosed herein allow mobile devices to form, temporarily leave, and rejoin a group. In some embodiments, it may be possible for a user to join a group the user was not present for at formation. In another embodiment, users may have to form a new group together to allow the new member to join the group. In one embodiment, the systems and methods disclosed herein allow several users that are located close to each other to agree to form a group on a temporary basis. In one embodiment, there are two stages to forming the group: selecting members and then going live on the server. For the first stage, selecting members, one embodiment uses Bluetooth. For the second stage, going live, all users may agree to have group data transmitted as cellular traffic, with or without charging implications, and to have data about themselves stored temporarily and securely on the group server.

In one embodiment, grouping includes a plurality of steps. For example, the steps of grouping may include finding group members using Bluetooth. All group members may select to start a group around about the same time. Bluetooth on the mobile device may switch on automatically and the device may scan for other devices in the neighborhood. Devices may be recognized as devices capable of forming a group based on the format of the device's Bluetooth name. The Bluetooth name may be a long string ending in the group members' nicknames (or initial Bluetooth name if the user did not give a nickname at initial setup). The mobile device may encode the data in this long string. In some embodiments, the data may include at least one of:

1) Data needed to identify a mobile device (single-byte, ASCII string)
2) User's Nick-name or Bluetooth name if the user did not enter a Nick-name in the user's profile
3) User's Public SIP URI
4) User's GSM number.

In some embodiments, each mobile device looks at all active mobile devices. Each mobile device may present a list of all potential group members it discovers to the user. The group application may list the Bluetooth name and/or Nickname of the discovered mobile device to the user. In one embodiment, if the device fails to find any more mobile devices after a given timeout, a leader role is allocated to one device. The group allocation may allocate the leader role as follows:

1) Group application extracts the URIs of all the devices
2) Group application selects the mobile device with the lowest URI alphabetically to be the leader.

In one embodiment, all devices can see who the group application designates with the 'leader' role and the 'other member' role.

In one embodiment, the steps of grouping may include the leader making decisions about the group and activating the group. For example, the leader may remove one or more user from the group. The leader may also decide whether the group will use the group talk feature. This may be a permanent setting for a dynamic group. If group talk is active, the mobile device may present the leader with a channel suggestion. The channel suggestions may include a channel 1-8 with the least power received. In some embodiment, the mobile device may suggest a channel with a high CTCSS code. A high CTCSS code may correspond to values that are unlikely to be in use by other walky talky users. In some embodiments, the leader can hear what the current input signal on the channel/code combination sounds like. For example, the leader may hear a silent input signal. However, if the leader hears a noisy input signal, the leader may request a better channel. In some embodiments, the leader may repeat these steps until the leader finds a desirable channel.

The leader may be prompted with other decisions, including, e.g., to agree to exchanging location information with others, incurring charges, and temporary storage of user data on the server. In some embodiments, the leader's mobile device sends key data about the group to the document and presence servers and is responsible for ensuring that each member is using the correct group configuration. In one embodiment, users do not see this step as it is completely transparent.

In one embodiment, the steps of grouping may further include other members preparing to join the group when it goes live. The other members may be prompted to agree to one or terms, including, e.g., exchanging their location information regularly—as long as the group session lasts—with other group members via GPRS and incurring the costs; and having location and presence data stored temporarily and securely—as long as the group session lasts—on the group server.

In some embodiments, the group application may warn users that data and roaming charges may be incurred. If the other members agree to join the group, the other members' mobile devices may log in to the group server and prepare the ground for joining the group when the leader device is ready.

In one embodiment, the steps of grouping may further include the leader selecting the final 'Go Live.' The other members may receive a notification that the group is now live.

What is claimed:

1. A method for defining a group of mobile devices, the method comprising:
    (a) broadcasting, by each mobile device of a plurality of mobile devices via Bluetooth, a device name of a predetermined format comprising a user name and a uniform resource identifier;
    (b) receiving, by each mobile device of the plurality of mobile devices via Bluetooth device discovery, the device name of each of the other mobile devices;
    (c) determining, by each mobile device, that the device name of each of the other mobile devices corresponds to the predetermined format;
    (d) designating, by a mobile device of the plurality of mobile devices, to be a leader of a group based on the uniform resource identifier identified from the device name of the mobile device;
    (e) providing, by the mobile device, a list of user names identified from each of the device names corresponding to the predetermined format; and
    (f) receiving, by the mobile device, a selection of one or more user names from the list to form the group.

2. The method of claim 1, wherein step (a) further comprises performing, via each device, a login of a user to a server.

3. The method of claim 1, wherein step (a) further comprises broadcasting, by each mobile device, its device name of the predetermined format further comprising a mobile device identifier.

4. The method of claim 1, wherein step (a) further comprises broadcasting, by each mobile device, its device name of the predetermined format further comprising a user's mobile telephone number.

5. The method of claim 1, wherein step (c) further comprises filtering out, by each mobile device, any device name received during Bluetooth device discovery that does not correspond to the predetermined format.

6. The method of claim 1, wherein step (d) further comprises designating, by the mobile device, to be the leader of the group based on its uniform resource identifier identified from its device name being lower alphabetically from any uniform resource identifier identified from device names of the other mobile devices.

7. The method of claim 1, wherein step (d) further comprises designating, by each of the other mobile devices of the plurality of mobile devices, to be a member of the group based on its uniform resource identifier identified in its device name being alphabetically higher than the uniform resource identifier of the other mobile devices.

8. The method of claim 1, wherein step (f) further comprises transmitting, by the mobile device responsive to the selection of the user names to form the group, a group formed message to the other mobile devices via a server.

9. The method of claim 1, wherein step (f) further comprises receiving, by the mobile device, selection of one or more features of the group from a user of the mobile device designated as the leader of the group.

10. The method of claim 1, wherein step (f) further comprises receiving, by the mobile device, a request, by a user designated as the leader of the group, to activate the formed group, transmitting, by the mobile device responsive to the request, a message to a server to activate the formed group and receiving, by each of the plurality of mobile devices, an indicator that the formed group is active.

11. A system for defining a group of mobile devices, the system comprising:
    a plurality of mobile devices, each mobile device of the plurality of mobile devices comprising a Bluetooth module, the Bluetooth module broadcasting a device name of a predetermined format comprising a user name and a uniform resource identifier and receiving, via Bluetooth device discovery, the device name of each of the other mobile devices;
    a filter of each mobile device determines that the device name of each of the other mobile devices corresponds to the predetermined format;
    a grouping module of a mobile device of the plurality of mobile devices designating the mobile device to be a leader of a group based on the uniform resource identifier identified from the device name of the mobile device, and providing a list of user names identified from each of the device names corresponding to the predetermined format; and
    wherein the grouping module of the mobile device receives a selection of one or more user names from the list to form the group.

12. The system of claim 11, wherein each mobile devices performs a login of a user to a server.

13. The system of claim 11, wherein each mobile device broadcasts its device name of the predetermined format further comprising a mobile device identifier.

14. The system of claim 11, wherein each mobile device broadcasts its device name of the predetermined format further comprising a user's mobile telephone number.

15. The system of claim 11, wherein the filter of each mobile device filters out any device name received during Bluetooth device discovery that does not correspond to the predetermined format.

16. The system of claim 11, wherein the grouping module designates the mobile device to be the leader of the group based on its uniform resource identifier identified from its device name being lower alphabetically from any uniform resource identifier identified from device names of the other mobile devices.

17. The system of claim 11, wherein the grouping module of each mobile device designates each of the other mobile devices of the plurality of mobile devices to be a member of the group based on its uniform resource identifier identified in its device name being alphabetically higher than the uniform resource identifier of the mobile device.

18. The system of claim 11, wherein the mobile device transmits, responsive to selection of the user names to form the group, a group formed message to the other mobile devices via the server.

19. The system of claim 11, wherein the mobile device receives the selection of one or more features of the group from the user of the mobile device designated as the leader of the group.

20. The system of claim 11, wherein the mobile device receives a request by the user to activate the formed group, transmits, responsive to the request, a message to a server to activate the formed group and each of the plurality of mobile devices receives an indicator that the formed group is active.

* * * * *